United States Patent [19]

Yoshino et al.

[11] Patent Number: 5,355,064
[45] Date of Patent: Oct. 11, 1994

[54] CONTROL SYSTEM FOR LEGGED MOBILE ROBOT

[75] Inventors: Ryutaro Yoshino; Hideo Takahashi; Minoru Kobayashi; Nobuaki Ozawa, all of Saitama, Japan

[73] Assignee: Honda Giken Kogyo Kabushiki Kaisha, Tokyo, Japan

[21] Appl. No.: 25,528

[22] Filed: Mar. 3, 1993

[30] Foreign Application Priority Data

| Mar. 4, 1992 | [JP] | Japan | 4-081381 |
| Mar. 31, 1992 | [JP] | Japan | 4-105316 |
| Apr. 28, 1992 | [JP] | Japan | 4-136257 |
| Apr. 28, 1992 | [JP] | Japan | 4-136258 |

[51] Int. Cl.$^5$ .......................... B25J 11/00; B25J 9/00
[52] U.S. Cl. .......................... 318/568.12; 318/568.11; 180/8.1; 180/8.6; 901/9; 901/1; 395/88
[58] Field of Search ............... 318/560-646; 180/8.1-8.7; 901/1, 3, 5, 7, 9, 12, 13, 15-23, 47, 48, 10, 33; 395/80-99; 414/730, 731, 732, 735; 364/424.02, 424.01

[56] References Cited

U.S. PATENT DOCUMENTS

| 4,826,392 | 5/1989 | Hayati | 901/9 |
| 4,834,200 | 5/1989 | Kajita | 180/8.1 |
| 5,115,178 | 8/1992 | Umeda | 318/568.11 |
| 5,151,859 | 9/1992 | Yoshino et al. | 364/424.02 |
| 5,159,988 | 11/1992 | Gomi et al. | 180/8.6 |
| 5,221,883 | 6/1993 | Takenaka et al. | 318/568.12 |

FOREIGN PATENT DOCUMENTS

| 6297006 | 5/1987 | Japan . |
| 150176 | 6/1988 | Japan . |
| 3184782 | 8/1991 | Japan . |
| 4141379 | 5/1992 | Japan . |
| 4201186 | 7/1992 | Japan . |

OTHER PUBLICATIONS

Raibert, M. H., Brown, Jr. H. B., "Experiments in Balance with a 2D One-Legged Hopping Machine", ASME, J of /DSMC, vol. 106, pp. 75–81 (Mar. 1984).

The two legged robot (J of the Robotic Society of Japan), vol. 1, No. 3, pp. 167–203 (Oct. 1983).

The four-legged robot (J of the Robotic Society of Japan), vol. 9, No. 5, pp. 638–643 (1981).

Six legged robot (Fischeti, M. A.), "Robots Do the Dirty Work", IEEE, Spectrum, vol. 22, No. 4, pp. 65–72 (1985).

S. Song and K. Waldron, "Machines That Walk; The Adaptive Suspension Vehicle", The MIT Press Cambridge, Mass., London, England.

Shimoyama, "Dynamic Walking of Stilt-type Biped Walking Robot", pp. 80–89 from Collected Papers of The Japan Society of Mechanical Engineers, Book C, vol. 48, pp. 433, pp. 1445–1454 (1982).

"Legged Robots on Rough Terrain; Experiments in Adjusting Step Length" by Jessica Hodgins, IEEE, (1988).

Primary Examiner—Paul IP
Attorney, Agent, or Firm—Lyon & Lyon

[57] ABSTRACT

A legged mobile robot control system for enabling the mobile robot, more particularly a biped walking robot to walk stably even over terrain with unexpected irregularities. The robot's motion is approximated by a mathematical model and a mathematical control is conducted, while controlling the robot's attitude on the basis of a walking pattern established in advance, without need to use a high-speed on board computer for non-linearlity compensation. In another embodiment made up of a more simple arrangement, when the foot angle deviates from that on flat terrain owing to the foot stepping on a bump, the foot angle is estimated and joints are driven such that the robot's center of gravity is restored in a predetermined target trajectory. In still another embodiment, the robot body's inclination angle and/or angular velocity is determined and the hip joints connecting the body with two legs are driven to restore a predetermined stable attitude.

35 Claims, 28 Drawing Sheets

FIG. 24

θcomm : joint angle command value
θact : actual value of joint angle
θrobot act : robot inclination angle
ωrobot act : robot inclination angular velocity
Kfoot : equivalent spring constant of ankle joint
Khip : equivalent spring constant of hip joint
Kpos : position control loop gain
Kv : velocity control loop gain
Kc : compliance control gain
Kθ : inclination angle control gain
Kω : inclination angular velocity control gain
Im : input side inertia
m : output side mass
I : output side inertia
h : distance between joint and center of gravity
d : disturbance

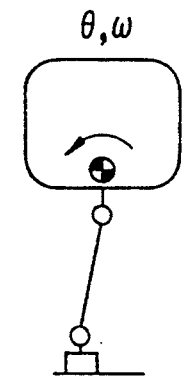
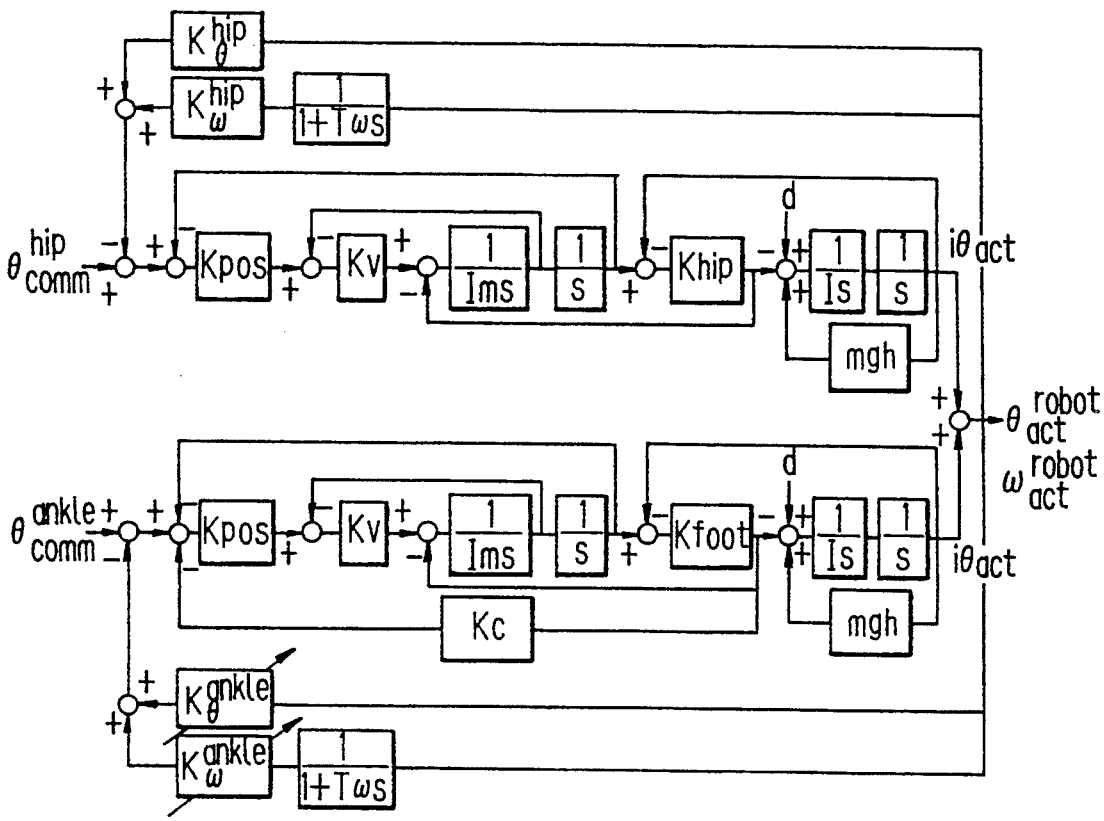

CONTROL SYSTEM FOR LEGGED MOBILE ROBOT

BACKGROUND OF THE INVENTION

1. Field of the Invention

This invention relates to a control system for a legged mobile robot, more particularly to such a system for enabling a biped walking robot to walk stably even over terrain with unexpected irregularities.

2. Description of the Prior Art

Wheeled, crawler, legged and other types of mobile robots have been proposed. Among the numerous reports published regarding control technologies for the legged mobile robot are included some relating to the one-legged robot (Raibert, M. H., Brown, Jr. H. B., "Experiments in Balance with a 2D One-Legged Hopping Machine", ASME, J of DSMC, vol. 106, pp. 75-81 (1984)), the two-legged robot (J of the Robotic Society of Japan, vol. 1, no. 3, pp. 167-203 (1983)), the four-legged robot (J of the Robotic Society of Japan, vol. 9, no. 5, pp. 638-643 (1991)), and the six-legged robot (Fischeti, M. A., "Robots Do the Dirty Work," IEEE, Spectrum, vol. 22, no. 4, pp. 65-72 (1985) and Shin-Min Song, Kenneth J. Waldron, "Machines That Walk; The Adaptive Suspension Vehicle", The MIT Press Cambridge, Mass., London, England). Other reports have been published regarding techniques for real time generation of a dynamically stable motion (walking) pattern for a robot with relatively few degrees of freedom (Shimoyama, "Dynamic Walking of Stilt-type Biped Walking Robot", Collected Papers of The Japan Society of Mechanical Engineers, book C, vol. 48, no. 433, pp. 1445-1454 (1982) and "Legged Robots on Rough Terrain; Experiments in Adjusting Step Length", by Jessica Hodgins, IEEE, (1988), while techniques for offline generation of a stable motion (walking) pattern for a robot with relatively many degrees of freedom (Japanese Laid-open Patent Publication Nos. 62(1987)-97006 and 63(1988)-150176).

Among them, the anthropoid biped robot comprises a main body unit to which two leg links are connected. The robot walks by repeatedly swinging first one and then the other leg link forward and setting the foot on the ground. This locomotion is ordinarily achieved by designing a locomotion pattern in advanced based on the assumption that the robot will walk over a smooth terrain, converting the pattern to joint angle trajectories, and controlling the joint angles so as to follow the trajectories without delay. The same applies regarding known stairs and inclines.

This prior art technology leads to problems when the terrain to be navigated includes unexpected (unknown) irregularities (bumps and depressions). While the foot angle of the robot's supporting leg is always constant when walking on a known terrain, this is not true on irregular terrain and, as a result, it is impossible for the robot to walk stably in accordance with the locomotion pattern designed with a specific known terrain in mind. In extreme cases, the robot may tip over. One technique for enabling stable topple-free walking on a terrain with unknown irregularities is to design a walking pattern that defines the robot attitude from the foot upward and then control the actual attitude to follow the designed attitude. This technique does not control the robot joint angles but controls the absolute angles of the links from the foot of the supporting leg upward, which is to say that it controls the robot's attitude with respect to the direction of gravity. This is possible because no matter what the angle of the supporting foot is, stable locomotion is ensured insofar as the target attitude (i.e. an attitude not susceptible to tip-over) is established above the foot. The assignee earlier proposed a system based on this concept in Japanese Patent Application No. 2(1990)-259,839 which was also filed in the United States under the number of 766,629 on Sep. 26, 1991.

This earlier technology proposed by the assignee approximates the robot's motion using a linear model. Therefore, for realizing smooth walking in accordance with a walking pattern in which the joint at the part of the supporting leg corresponding to the human knee is required to make very large movements or with a walking pattern involving large strides which cause major deviation from linearity, it is necessary to compensate for nonlinearity, as is often seen in the control of a manipulator of a stationary robot. This, however, requires a high-speed computer to be installed in the robot's control unit, which is undesirable for a mobile robot because of the large size and heavy weight of such a computer.

SUMMARY OF THE INVENTION

The object of this invention is therefore to provide a control system for a legged mobile robot which, while controlling the robot's attitude on the basis of a walking pattern designed in advance, enables smooth walking without need to use a high-speed computer for nonlinearity compensation even with respect to a walking pattern that loses linearity, and which further enables a stable walking attitude to be constantly secured not only on flat terrain but also on terrain with unknown irregularities.

Moreover, in the earlier technology proposed by the assignee, which divides the robots motion into the fore-/aft and the left/right directions and approximates the motion in each direction by a three-link model. As shown in FIG. 20, the fore/aft motion is modeled by determining the absolute angle of the supporting leg by the absolute angle of the link 1 or link 2 while determining the absolute angle of the free leg from the absolute angle of the link 4 or the link 5, on the assumption that the knee joint bends only slightly during walking. This technique gives good results for walking that does not involve much knee joint bending.

However, during situations which involve marked knee bending, whether during stair climbing/descent or on flat terrain, it is susceptible to large errors. On the hand, any attempt to overcome this problem simply by increasing the number of robot model links is unlikely to succeed because it will greatly complicate the control system design and place a heavy processing load on the computer during the actual control.

Therefore, the second object of the present invention is to overcome the aforesaid technical impasse by providing a control system for a legged mobile robot wherein a fore/aft direction model for a biped walking robot is mathematically approximated to a degree of accuracy approaching that a five link model involving subdivision by the knee joint, notwithstanding that it is maintained as a three-link model even during locomotion involving marked knee bending.

Furthermore, as earlier mentioned, the method for generating stable walking patterns offline assume that the robot's feet are horizontal during walking on a flat terrain and control the joint angles so as to follow dynamically stable joint angle trajectories (walking pattern). For example, during static walking it suffices to control the center of gravity trajectory to remain constantly within the feet, while during dynamic walking it suffices to control the center of gravity trajectory so as to maintain the ZMP (Zero Moment Point) within a region connecting the feet. As repeatedly mentioned, in actual practice, however, the terrains over which legged mobile robots move seldom conform strictly to those presumed by the design but instead frequently include irregularities (bumps and depressions) and inclines not contemplated by the walking pattern. When the mobile walking robot encounters such an irregularity or incline, the angle of the foot of its supporting leg inclines, causing the center of gravity trajectory to deviate from the target trajectory. As a result, the attitude of the robot becomes unstable. The foregoing is also true as regards the methods for generating motion patterns in real time. Such disturbances are a cause for loss of proper attitude.

The third object of this invention is therefore to provide a control system for a legged mobile robot which provides the robot with enhanced walking capability in the locomotion environment, enabling it to walk stably at all times without loss of proper attitude even when unexpected terrain irregularities and inclines are encountered.

Still furthermore, in such legged walking robots it is particularly important to maintain a stable attitude at all times during walking. In another Japanese Patent Application No. 2(1990)-336,419 which was also filed in the United States under the number of 799,367 on Nov. 27, 1991, (ref. U.S. Pat. No. 5,221,883) the assignee proposed a technology for improving the walking stability of a legged walking robot by feeding back the robot's inclination angle and inclination angular velocity to the ankle joints and disclosed applications of this technology enabling stable walking by a legged walking robot.

The fourth object of this invention is therefore to provide a control system for a legged or other linkage type mobile robot which, through improvement of the earlier proposed technology, enables attitude stabilization to be achieved even more effectively.

For realizing these objects, the present invention provides a system for controlling locomotion of a legged walking robot having a body and a plurality of leg links each connected to the body link, including servo motor means provided at individual joints of the link, and first means for providing a control input to each servo motor means such that it drives the associated joint to a target angle. In the system, second means is provided for determining a deviation between the target joint angle and an actual joint angle as an absolute angle with respect to the direction of gravity and third means is provided for determining a second control input in response to the determined deviation. And fourth means is provided for summing the first and the second control inputs to provide the sum to the servo motor means.

BRIEF DESCRIPTION OF THE DRAWINGS

The above and other objects and advantages of the invention will be more apparent from the following description and drawings, in which:

FIG. 24 is a block diagram showing a fifth embodiment of the invention;

DETAILED DESCRIPTION OF THE PREFERRED EMBODIMENTS

Embodiments of the invention will now be explained based on a biped robot as an example of a legged mobile robot.

Figure 1:
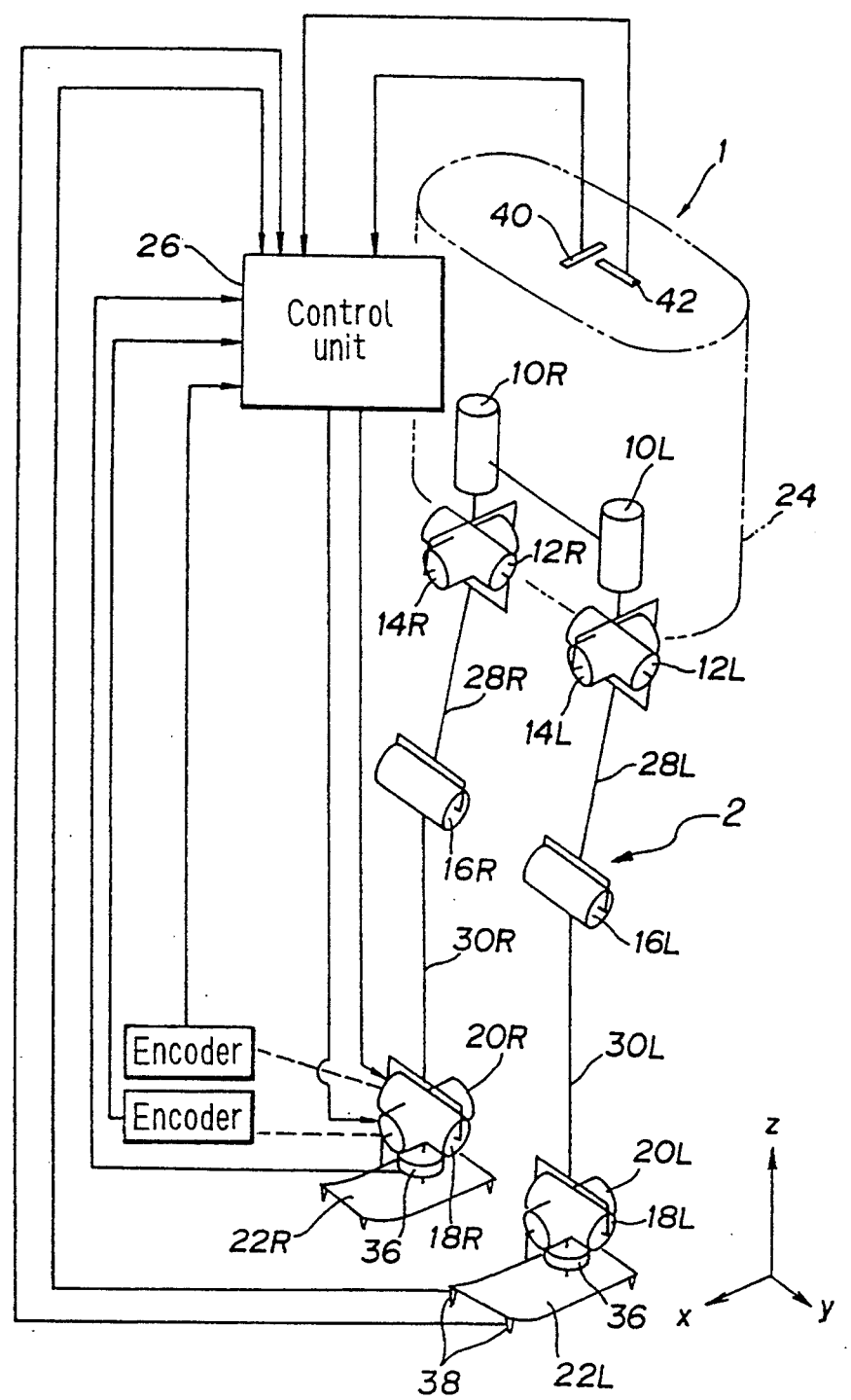
FIG. 1 is a schematic view showing the overall configuration of the legged mobile robot control system according to the invention.

An overall skeleton view of a biped robot 1 is shown in FIG. 1. The robot 1 has left and right legs each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the pitch direction (x direction), joints (axes) 14R, 14L for rotation at the hip in the roll direction (y direction), joints (axes) 16R, 16L for rotation at the knee in the pitch direction, joints (axes) 18R, 18L for rotation at the ankle in the pitch direction and joints (axes) 20R, 20L for rotation at the ankle in the roll direction. Foot members 22R, 22L are provided at the lower end of this arrangement and a body (main unit) 24 housing a control unit 26 is provided at the upper end. The hip joints in the foregoing configuration are constituted by the joints (axes) 10R(L), 12R(L) and 14R(L) and the ankle joints by the joints (axes) 18R(L) and 20R(L). The hip and knee joints are connected by thigh links 28R, 28L and the knee joints and ankle joints by crus links 30R, 30L.

The leg links of the respective legs thus have six degrees of freedom, so that during locomotion the legs as a whole can be caused to execute the desired movement by driving the 6×2=12 joints (axes) to appropriate angle. The robot is thus capable of walking freely within three-dimensional space. The joints are provided mainly by electric motors, as was mentioned earlier, and reduction gear mechanism for increasing motor torque. The structure of the joints is described in the assignee's earlier Japanese Patent Application No. 1(1989)-324,218 (Japanese Laid-open Patent Publication No. 3(1991)-184,782), etc., and since it is not an essential aspect of the present invention, will not be explained further here.

The individual ankles of the robot 1 shown in FIG. 1 are provided with a six dimensional force and torque sensor 36 of conventional design. By measuring the x, y and z force components Fx, Fy and Fz transmitted to the robot through the foot members and also measuring the moment components Mx, My and Mz around the three axes, the six-dimensional force and torque sensor 36 detects whether or not the associated foot member has landed and the magnitude and direction of the forces acting on the supporting leg. The sole of each foot member is equipped at its four corners with touchdown switches 38 of conventional design for detecting whether or not the foot is in contact with the ground. The top of the body 24 is provided with a pair of inclination sensors 40, 42 for detecting the robot's inclination angle and angular velocity relative to the z axis in the x-z and y-z planes. Each electric motor at the individual joints is provided with a rotary encoder for generating rotational information. (In FIG. 1, only encoders associated with the ankle joints are illustrated.) The outputs of the sensors 36 and the like are sent to the control unit 26 in the body.

Figure 2:
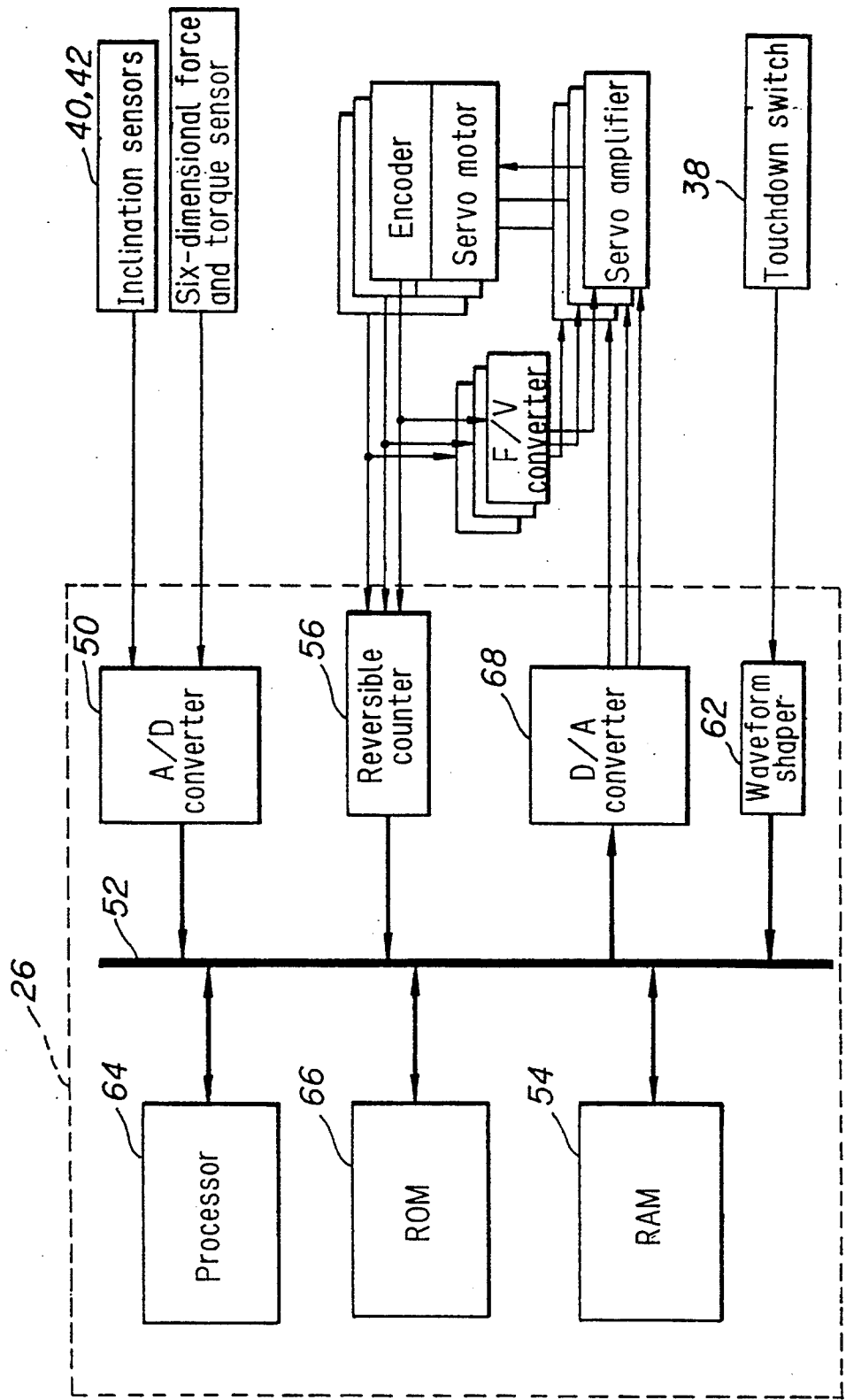
FIG. 2 is a block diagram showing the details of the control unit illustrated in FIG. 1.

As shown in the block diagram of FIG. 2, the control unit 26 has a microcomputer. The outputs from the inclination sensors 40, 42 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56, while the outputs of the touchdown switches 38 are stored in the RAM 54 via a waveform shaper 62. The control unit has a CPU (central processing unit) 64 which fetches locomotion data from a ROM (read-only memory) 66 and computes current command values from the deviation relative to the measured values received from the counter 56, and sends the same to a servo amplifier of the respective motors via a D/A converter 68. As illustrated, the output of the individual encoders is forwarded to the associated servo amplifier such that velocity feedback control is realized, as shown in FIG. 3, as a minor loop.

The operation of the control system according to the invention will now be explained.

Figure 3:
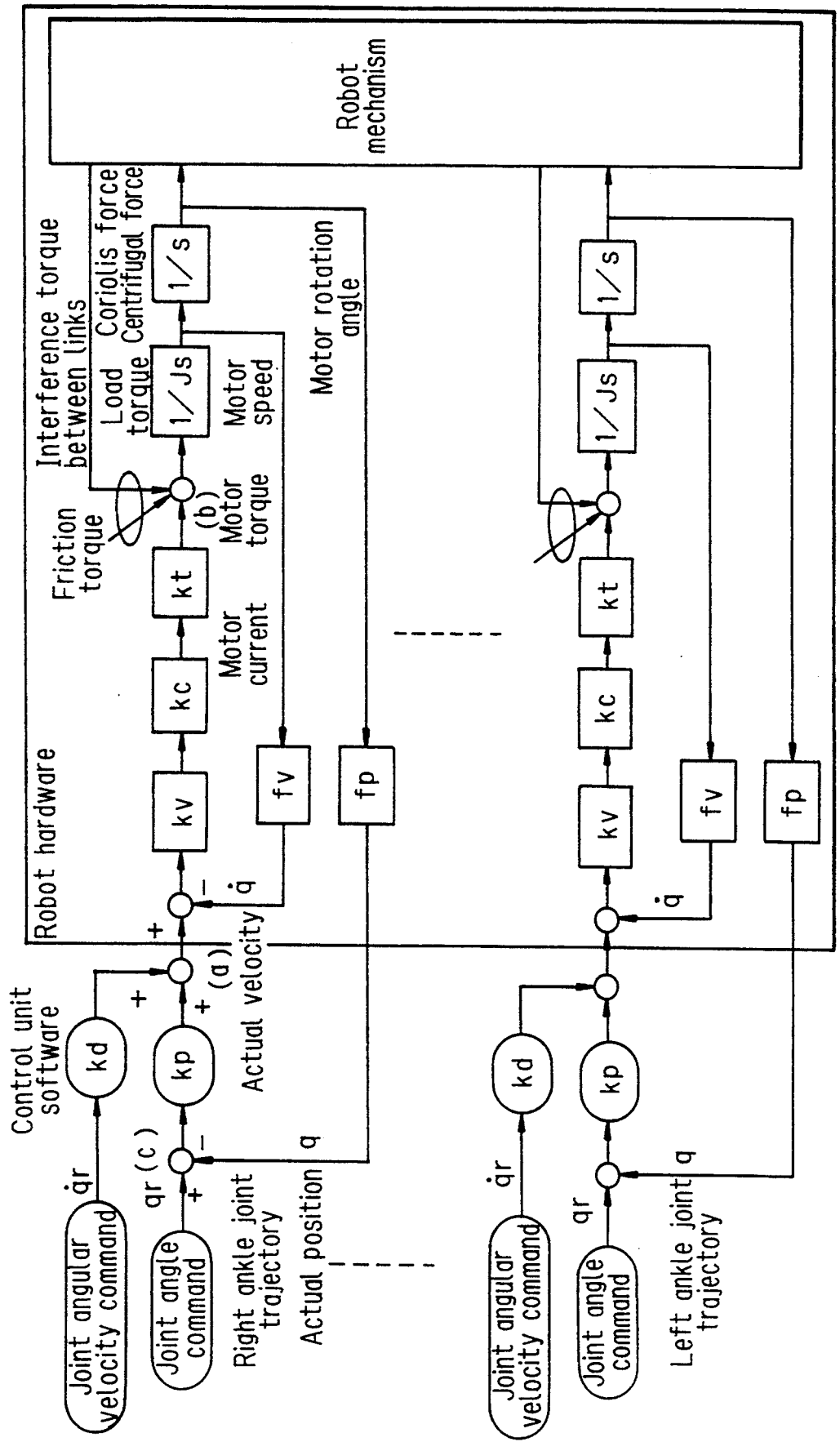
FIG. 3 is a block diagram showing a conventional joint angle servo control system configured for use with the robot of FIG. 1.

FIG. 3 is a block diagram showing a conventional joint angle servo control system configured for use with the robot 1 of FIG. 1. A walking pattern designed offline assuming a flat terrain is converted into angles qr and angular velocities q(with dot)r (time series data) for the twelve joints, namely, is converted into joint trajectories, and the results are output to the servo amplifiers of the joints at prescribed intervals as command values. As a result, the joint angles follow the command values with substantially no delay, thus driving the robot 1 to walk in accordance with the designed walking pattern. While this enables the robot 1 to walk on flat terrain without any problem, it does not ensure that it will be able to walk stably upon encountering unexpected irregular terrain because under such conditions the angle of the foot of the supporting leg does not stay constant.

Figure 4:
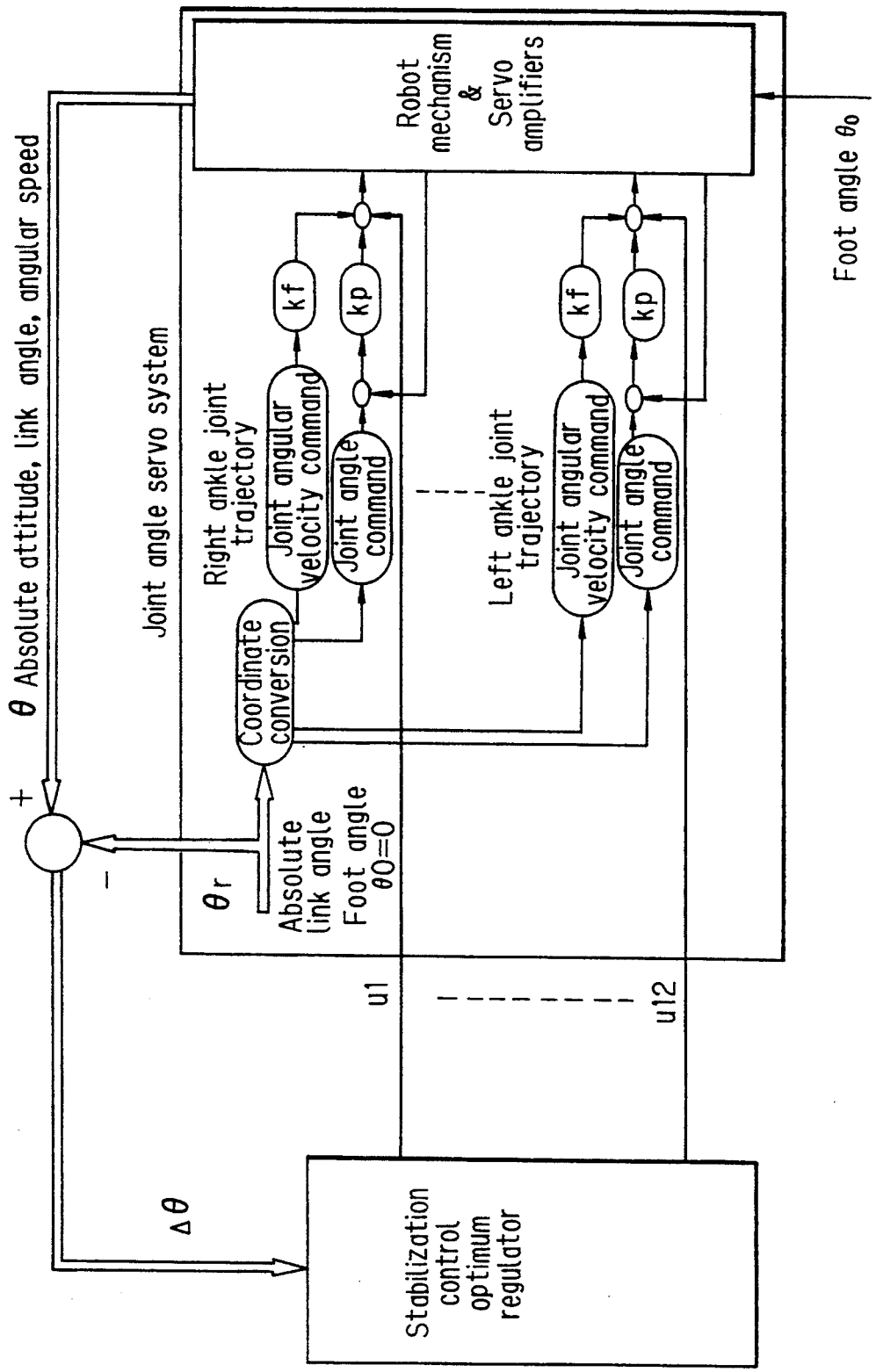
FIG. 4 is a block diagram, similar to FIG. 3, but showing the characteristic features of the control according to a first embodiment of the invention.

As shown in FIG. 4, for overcoming this problem and enabling stable walking on irregular terrain, the present invention adds to the joint angle servo control system of FIG. 3 a control input (manipulated variable) u which will be explained later. The computation of the control input u and the stabilization of walking using it will now be explained.

To begin with, a mathematical model will be defined for a robot 1 equipped with the joint angle servo control system of FIG. 3. For this, the following assumptions are established.

Figure 5:
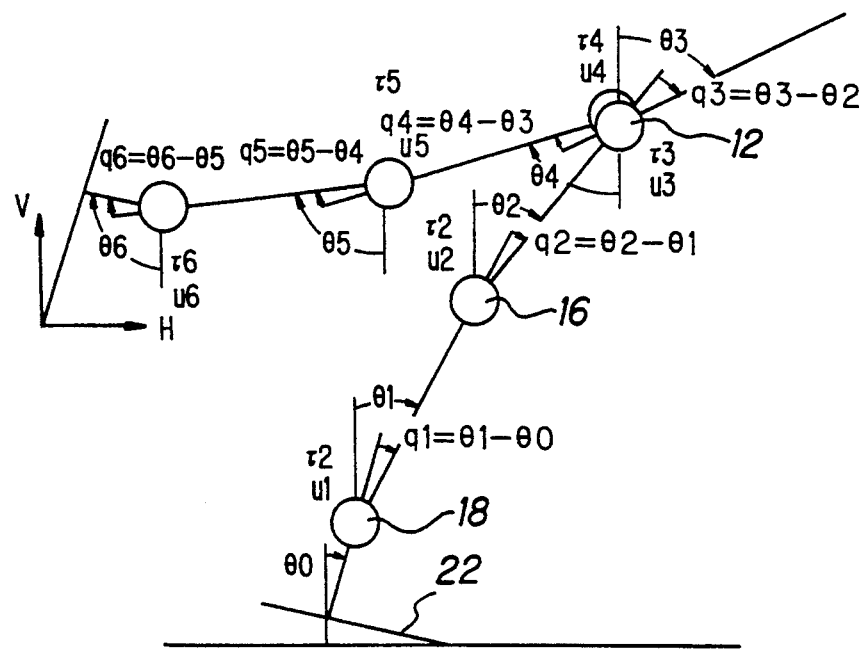
FIGS. 5 and 6 are explanatory views showing the relationship between the joint angles and the link angles.

Assumption 1: Owing to the stability control, the mutual interference between the fore/aft motion and left/right motion of the robot 1 is acceptably small and separable. (FIG. 5 shows the fore/aft motion and FIG. 6 the left/right motion.)

Assumption 2: The foot 22R(L) of one of the two leg linkages is totally in contact with the ground. The leg whose foot is totally in contact with the ground is the supporting leg.

Assumption 3: The foot of the supporting leg does not move (slip) relative to the ground. (A walking pattern is generally designed such that during the one-leg support period the foot of the supporting leg does not move relative to the ground. For example, the ZMP (zero moment point) concept is adopted and the ZMP trajectory is determined such that the foot does not leave the ground. Even in a walking pattern which adopts the inverted pendulum concept, the foot does not physically separate from the ground during turning about the ankle. Slipping can be prevented by an appropriate means, such as by coating the bottom of the foot with rubber.)

Based on the foregoing assumptions, the equation of motion for the robot 1 can be expressed as in Equation 1. As is apparent from Equation 1, if based on assumption 3, the robot's motion does not have a relationship with the angle of its foot.

$$J(\Theta) \cdot \ddot{\Theta} + X(\Theta) \cdot \dot{\Theta}^2 + Z(\Theta) + Y(\Theta) \cdot F = M \cdot T \quad (1)$$

where $\Theta = (\theta 1, \theta 2, \ldots, \theta n)$: robot link angle (attitude)
$T = (\tau 1, \tau 2, \ldots, \tau n)$: joint torque
$F = (H, V)$: external force acting on free leg
$M$: constant matrix.

Since the joint angle servo control system shown in FIG. 3 is adopted in this control, the torque (the motor torque in FIG. 3) produced at the respective joints (represented by the symbol i) is calculated from the joint angle qi and the joint angle command value qir using Equation 2. (kp, kd and fv in Equation 2 are used to mean values obtained by including kp and kd in FIG. 3 into each of kv, kc and kt.)

$$\tau i = kp \cdot (qir - qi) + kd \cdot \dot{q}ir - fv \cdot \dot{q}i \quad (2)$$

Figure 6:
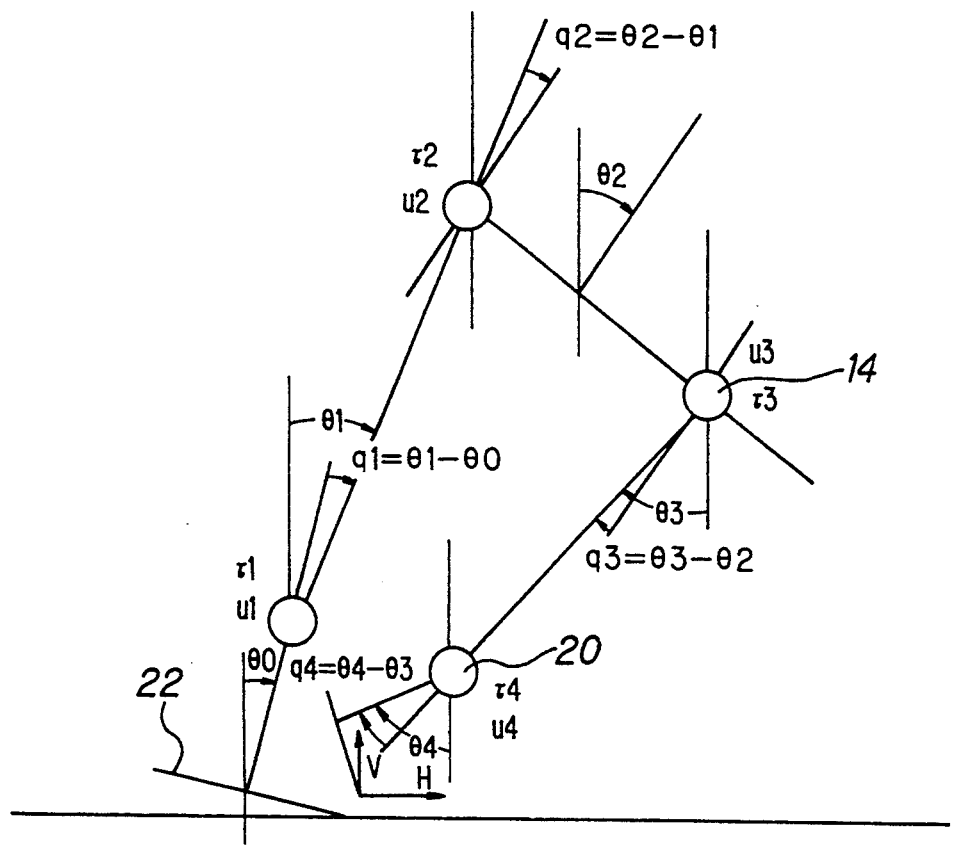

As shown in FIGS. 5 and 6, the relationship between the joint angle qi and the link angle $\theta$i is represented by Equation 3. (In this specification, the "joint angle" or "q" is used to mean the angle between links (i.e. a relative angle) and "link angle" or "$\theta$" is used to mean the angle of the link with respect to the direction of gravity (in an absolute coordinate system).)

$$qi = \theta_i - \theta_{i-1} (i = 1 \sim n) \quad (3)$$

Using Equation 3 to rewrite Equation 2 to represent the link angle gives Equation 4.

$$T = Kr \cdot \Theta r + \dot{K}r \cdot \dot{\Theta} r - Fp \cdot \Theta - Fv \cdot \dot{\Theta} - Im \cdot \ddot{\Theta} + d(\theta 0, \theta 0 r) \quad (4)$$

where

Kr: constant matrix
Fp, Fv: gain matrices
Im: motor inertial moment matrix
$\theta 0$: supporting leg foot angle
$\theta 0r$: supporting leg target foot angle
$\Theta r, \dot{\Theta} r$: target link angle, angular speed (target attitude).

The disturbance d ($\theta 0, \theta 0 r$) in Equation 4, i.e. the value arising owing to the actual and target values of the foot angle $\theta 0$, can be represented by Equation 5.

$$d(\theta 0, \theta 0 r) =$$

-continued $$\begin{pmatrix} kr \cdot \theta 0r - fp \cdot \theta 0 + \dot{k}r \cdot \dot{\theta} 0r - fv \cdot \dot{\theta} 0 + n1 \cdot Im \cdot \ddot{\theta} 0 \\ 0 \\ \cdot \\ \cdot \\ \cdot \\ 0 \end{pmatrix}$$

Substituting Equation 4 into Equation 1 and rewriting the result gives Equation 6.

$$(J(\Theta) + M \cdot Im) \cdot \ddot{\Theta} + X(\Theta) \cdot \dot{\Theta}^2 + Z(\Theta) + Y(\Theta) \cdot F + M \cdot \quad (6)$$

$$Fp \cdot \Theta + M \cdot Fv \cdot \dot{\Theta} + M \cdot d(\theta 0 r, \theta 0) = M \cdot \dot{K}r \cdot \dot{\Theta} r + M \cdot$$

$$Kr \cdot \Theta rd(\theta 0 r, \theta 0) = -d(\theta 0, \theta 0 r)$$

Equation 6 is the equation of motion of the robot owing to the joint angle servo system. While the control input in Equation 1 is that of the joint torque T, in Equation 6 it is target attitude $\Theta r$ (absolute angle) and $\Theta$(with dot)r (absolute angular velocity) (here "$\Theta$" is a capital letter). Further, while the term foot angle $\theta 0$ (absolute angle) does not appear in Equation 1, it does in Equation 6 (here "$\theta$" is a small letter). If the joint angle servo system causes the robot to walk on a terrain with unknown irregularities, therefore, the resulting random variation in the foot angle $\theta 0$ will act as a disturbance upsetting the motion according to Equation 6 and thus destabilize the locomotion. Therefore, from Assumption 3, the target attitude enabling walking, i.e. the walking pattern, can be designed only by knowing the terrain configuration in advance. In the case of walking on a flat terrain, the foot angle is zero and, therefore, Equation 7 is obtained.

$$\theta 0r = 0, \dot{\theta} 0r = 0, \theta 0 = 0, \dot{\theta} 0 = 0, \ddot{\theta} 0 = 0, d(\theta 0r, \theta 0) = 0 \quad (7)$$

In other words, the target attitude $\Theta r$, $\Theta$ (with dot)r becomes the walking pattern for flat terrain. In this case the robot's equation of motion (Equation 6) can be expressed as Equation 8.

$$(J(\Theta) + M \cdot Im) \cdot \ddot{\Theta} + X(\Theta) \cdot \dot{\Theta}^2 + Z(\Theta) + Y(\Theta) \cdot F + M \cdot \quad (8)$$

$$Fp \cdot \Theta + M \cdot Fv \cdot \dot{\Theta} = M \cdot Kr \cdot \Theta r + M \cdot \dot{K}r \cdot \dot{\Theta} r$$

On the other hand, if optimum values are selected for the joint angle servo constant Kr etc., the actual joint trajectory will follow the target joint trajectory with substantially no delay, whereby we get Equation 9 and then Equation 10.

$$\theta 1 \approx \theta 1r, \theta 2 - \theta 1 \approx \theta 2r - \theta 1r, \ldots, \theta 6 - \theta 5 \approx \theta 6r - \theta 5r \quad (9)$$

$$\theta 1 \approx \theta 1r, \theta 2 \approx \theta 2r, \ldots, \theta 6 \approx \theta 6r \quad (10)$$

In view of Equation 8, therefore, it follows that Equation 11 holds as an approximation.

$$(J(\Theta r) + M \cdot Im) \cdot \ddot{\Theta} r + X(\Theta r) \cdot \dot{\Theta} r^2 + Z(\Theta r) + Y(\Theta r) \cdot \quad (11)$$

$$Fr + M \cdot Fp \cdot \Theta r + M \cdot Fv \cdot \dot{\Theta} r \approx M \cdot Kr \cdot \Theta r + M \cdot \dot{K}r \cdot \dot{\Theta} r$$

As has been repeatedly pointed out, when the flat terrain includes unknown irregularities (bumps and depressions), it is difficult to create a walking pattern enabling locomotion because the foot angle $\theta 0$ assumes unknowable values other than zero. If it is assumed that the terrain irregularities are slight (large irregularities such as steps and stairs can be easily detected by equipping the robot 1 with visual means) and the flat terrain walking pattern $\Theta r$ is used (i.e. where disturbance $d(\theta r, \theta 0)=0$), then defining the attitude shift (deviation) owing to an irregularity as delta $\Theta$, the robot's attitude can be represented by Equation 12.

$$\Theta = \Theta r + \Delta \Theta \qquad (12)$$

For compensating for the shift, therefore, a correction amount U is introduced into the joint torque of Equation 4 in the manner of Equation 13.

$$T = Kr \cdot \Theta r + \dot{K}r \cdot \dot{\Theta}r - Fp \cdot \Theta - Fv \cdot \dot{\Theta} - Im \cdot \ddot{\Theta} + Ku \cdot U \qquad (13)$$

where
$U = (u1, u2, \ldots, un)$, $d(\theta 0, \theta 0 r) = 0$.

It will be understood that Equation 13 is the result of adding the correction amount U to the torque produced by the joint angle servo system during walking over flat terrain, namely in the $(\theta 0 r, \theta 0 = 0)$ state.

Calculation of the correction amount U will now be explained. Substituting Equations 12 and 13 into the robot equation of motion (Equation 1) gives Equation 14, which is an equation of motion expressed in terms of flat terrain walking pattern $\Theta r$ and shift delta $\Theta$.

$$(J(\Theta r + \Delta \Theta) + M \cdot Im) \cdot (\ddot{\Theta}r + \Delta \ddot{\Theta}) + X(\Theta r + \Delta \Theta) \cdot \qquad (14)$$

$$(\dot{\Theta}r + \Delta \dot{\Theta})^2 + Z(\Theta r + \Delta \Theta) + Y(\Theta r + \Delta \Theta) \cdot (Fr + \Delta F) +$$

$$M \cdot Fp \cdot (\Theta r + \Delta \Theta) + M \cdot Fv \cdot (\dot{\Theta}r + \Delta \dot{\Theta}) =$$

$$M \cdot Kr \cdot \Theta r + M \cdot \dot{K}r \cdot \dot{\Theta}r + M \cdot Ku \cdot U$$

Since shift delta $\Theta$ is slight when the terrain irregularity is slight, Equation 14 can be modified into Equation 15.

$$(J(\Theta r) + (\partial J/\partial \theta)r \cdot \Delta \Theta + M \cdot Im) \cdot (\ddot{\Theta}r + \Delta \ddot{\Theta}) + (X(\Theta r) + \qquad (15)$$

$$(\partial X/\partial \theta)r \cdot \Delta \Theta) \cdot (\dot{\Theta}r + \Delta \dot{\Theta})^2 + (Z(\Theta r) + (\partial Z/\partial \theta)r \cdot \Delta \Theta) +$$

$$(Y(\Theta r) + (\partial Y/\partial \theta)r \cdot \Delta \Theta) \cdot (Fr + \Delta F) + M \cdot Fp \cdot (\Theta r + \Delta \Theta) +$$

$$M \cdot Fv \cdot (\dot{\Theta}r + \Delta \dot{\Theta}) = M \cdot Kr \cdot \Theta r + M \cdot \dot{K}r \cdot \dot{\Theta}r + M \cdot Ku \cdot U$$

where
$(\partial J/\partial \theta)r, (\partial X/\partial \theta)r, (\partial Z/\partial \theta)r, (\partial Y/\partial \theta)r$: partial differential value at $\theta = \theta r$.

Ignoring quadratic and higher delta $\Theta$ terms, we get Equation 16.

$$(J(\Theta r) + M \cdot Im) \cdot \ddot{\Theta}r + X(\Theta r) \cdot \dot{\Theta}r^2 + Z(\Theta r) + Y(\Theta r) \cdot Fr + \qquad (16)$$

$$M \cdot Fp \cdot \Theta r + M \cdot Fv \cdot \dot{\Theta}r + (J(\Theta r) + M \cdot Im) \cdot \Delta \ddot{\Theta} + (\partial J/\partial \theta)r \cdot$$

$$\ddot{\Theta}r \cdot \Delta \Theta + 2X(\Theta r) \cdot \dot{\Theta}r \cdot \Delta \dot{\Theta} + (\partial X/\partial \theta)r \cdot \dot{\Theta}r^2 \cdot \Delta \Theta + (\partial Z/\partial \theta)r \cdot$$

$$\Delta \Theta + M \cdot Fp \cdot \Delta \Theta + M \cdot Fv \cdot \Delta \dot{\Theta} + (\partial Y/\partial \theta)r \cdot Fr \cdot \Delta \Theta + Y(\Theta r) \cdot$$

$$\Delta F = M \cdot Kr \cdot \Theta r + M \cdot \dot{K}r \cdot \dot{\Theta}r + M \cdot Ku \cdot U$$

In view of Equation 11, which holds when the joint angle servo follows at high speed, Equation 17 can be written as an approximation of Equation 16.

$$(J(\Theta r) + M \cdot Im) \cdot \Delta \ddot{\Theta} + (2X(\Theta r) \cdot \dot{\Theta}r + M \cdot Fv) \cdot \Delta \dot{\Theta} + \qquad (17)$$

-continued $$((\partial J/\partial \theta)r \cdot \ddot{\Theta}r + (\partial X/\partial \theta)r \cdot \dot{\Theta}r^2 + (\partial Z/\partial \theta)r + (\partial Y/\partial \theta)r \cdot$$

$$Fr + M \cdot Fp) \cdot \Delta \Theta + Y(\Theta r) \cdot \Delta F = M \cdot Ku \cdot U$$

Further, since $J(\Theta r)$ varies little with $\Theta$, the value of $X(\Theta r)$ is small and the values of joint angle servo gains Fp, Fv are large, the magnitude relationships of Equation 18 hold.

$$2X(\Theta r) \cdot \dot{\Theta}r << M \cdot Fv \qquad (18)$$

$$(\partial J/\partial \theta)r \cdot \ddot{\Theta}r + (\partial X/\partial \theta)r \cdot \dot{\Theta}r^2 << (\partial Z/\partial \theta)r + M \cdot Fp$$

Equation 17 can therefore be expressed as Equation 19.

$$(J(\Theta r) + M \cdot Im) \cdot \Delta \ddot{\Theta} + M \cdot Fv \cdot \Delta \dot{\Theta} + ((\partial Z/\partial \theta)r + \qquad (19)$$

$$(\partial Y/\partial \theta)r \cdot Fr + M \cdot Fp) \cdot \Delta \Theta + Y(\Theta r) \cdot \Delta F = M \cdot Ku \cdot U$$

Equation 19 is the equation of motion for a shift delta $\Theta$ from the walking pattern and the correction amount U required for stabilization is the control input for controlling the delta $\Theta$ motion. If the control input U which causes shift delta $\Theta$ to become zero can be derived, it will become possible to converge the robot's attitude on the flat terrain walking pattern and achieve stable locomotion even when the actual terrain includes irregularities.

Calculation of a control input U for making the shift delta $\Theta$ zero will now be explained. Consider the control input U expressed by Equation 20. In this equation delta F is the amount of change in the external force acting on the free leg. It can be detected by the six-dimensional force and torque sensor 36.

$$U = U\theta + (M \cdot Ku)^{-1} \cdot Y(\Theta r) \cdot \Delta F \qquad (20)$$

Substituting Equation 20 into Equation 19 gives Equation 21.

$$(J(\Theta r) + M \cdot Im) \cdot \Delta \ddot{\Theta} + M \cdot Fv \cdot \Delta \dot{\Theta} + ((\partial Z/\partial \theta)r + \qquad (21)$$

$$(\partial Y/\partial \theta)r \cdot Fr + M \cdot Fp) \cdot \Delta \Theta = M \cdot Ku \cdot U\theta$$

Therefore, if Equation 20 used to calculate U, Equation 21 becomes a linear equation relating to the shift delta $\Theta$ making it possible to determine the optimum control value. Note, however, that if the amount of external force change delta F is small enough to be deemed a disturbance in Equation 21 (delta $F \approx 0$), then a certain degree of stabilization is also attainable by ignoring the second term of Equation 20 and calculating only control input $U\theta$. This situation arises such as where delta F is approximately equal to zero during a one-leg support period because no external force is acting on the free leg.

Calculation of the control input $U\theta$ will now be explained.

As Equation 21 is a linear equation relating to delta $\Theta$, it can be represented using state equation expressions as shown in Equation 22.

$$\dot{X} = A \cdot x + B \cdot u$$

$$y = C \cdot x$$

$$x = (\Delta \theta 1, \Delta \theta 2, \ldots, \Delta \theta n, \Delta \dot{\theta} 1, \Delta \dot{\theta} 2, \ldots, \Delta \dot{\theta} n)^t$$

$$u = (u1, =2, \ldots, un)^t U\theta$$

$$y = (\Delta\theta 1, \Delta\theta 2, \ldots, \Delta\theta n)^t \quad (22)$$

Using the optimum regulator theory, the u which minimizes the quadratic performance function J shown in Equation 23 can be expressed as Equation 24.

$$J = \int_0^\infty (x^t Q x + u^t R u) dt \quad (23)$$

$$u = -Kx \cdot x \quad (24)$$

As can be seen from Equation 23, minimizing performance function J means making the state variable x as small as possible with the smallest possible control input u. In other words, it means making the shift delta Θ caused by terrain irregularity as small as possible. By calculating the correction amount (control input) u from Equation 24, therefore, it is possible to realize stable locomotion.

On the other hand, if the external force change delta F and the model error of the matrices A and B are considered to be disturbance d, Equation 22 can be expressed as Equation 25.

$$\dot{X} = A \cdot x + B \cdot u + d$$

$$y = C \cdot x \quad (25)$$

Further, in line with the optimum regulator theory, the u which minimizes the quadratic performance function J shown in Equation 26 can be calculated as shown by Equation 27.

$$J = \int_0^\infty (y^t Q y + \dot{u}^t R \dot{u}) dt \quad (26)$$

$$u = -Kx \cdot x + Ki \cdot \int_0^\infty y dt \quad (27)$$

Like Equation 24, Equation 27 also provides a method for a correction amount (control input) u enabling stable locomotion.

For calculating u it is necessary to determine the gains Kx, Ki and the state amounts x. Gains Ki and Kx can be obtained in the known manner by solving the Riccati equation. The state amounts x are the link angle and angular velocity and can be determined by the inclination sensors 40, 42 mounted on the robot's main unit 24 and the rotary encoders disposed at the joints. Therefore, in the case of fore/aft motion, for example, Equation 3 can be rewritten as Equation 28.

$$q1 = \theta 1 - \theta 0$$

$$q2 = \theta 2 - \theta 1$$

$$q3 = \theta 3 - \theta 2$$

$$q4 = \theta 4 - \theta 3$$

$$q5 = \theta 5 - \theta 4$$

$$q6 = \theta 6 - \theta 5 \quad (28)$$

Since the inclination angle $\theta 3$ of the main unit 24 can be detected by the inclination sensors 40, 42, if the detected value is defined as $\Phi$, then using the joint angle qi, Equation 29 follows from Equation 28.

$$\theta 3 = \Phi$$

$$\theta 2 = \theta 3 - q3 = \Phi - q3$$

$$\theta 1 = \theta 2 - q2 = \Phi - q2 - q3$$

$$\theta 0 = \theta 1 - q1 = \Phi - q1 - q2 - q3$$

$$\theta 4 = \theta 3 + q4 = \Phi + q4$$

$$\theta 5 = \theta 4 + q5 = \Phi + q4 + q5$$

$$\theta 6 = \theta 5 + q6 = \Phi + q4 + q5 + q6 \quad (29)$$

Shift delta Θ can therefore be expressed by Equation 30.

$$\begin{aligned}
\Delta\theta 1 &= \theta 1 - \theta 1r = \phi - q^2 - q^3 - (0 - q2r - q3r) \\
&= \phi - \Delta q^2 - \Delta q^3 \\
\theta 2 &= \theta 2 - \theta 2r = \phi - q3 - (0 - q3r) \\
&= \phi - \Delta q3 \\
\Delta\theta 3 &= \theta 3 - \theta 3r = \phi - 0 \\
&= \phi \\
\Delta\theta 4 &= \theta 4 - \theta 4r = \phi + q4 - (0 + q4r) \\
&= \phi + \Delta q4 \\
\Delta\theta 5 &= \theta 5 - \theta 5r = \phi + q4 + q5 - (0 + q4r + q5r) \\
&= \phi + \Delta q4 + \Delta q5 \\
\Delta\theta 6 &= \theta 6 - \theta 6r = \phi + q4 + q5 + q6 - \\
&\quad (0 + q4r + q5r + q6r) \\
&= \phi + \Delta q4 + \Delta q5 + \Delta q6
\end{aligned} \quad (30)$$

where
$\Delta qi = qi - qir$, $i = 1, \ldots, 6$

Hence Equation 30 can be expressed in terms of a matrix as in Equation 31.

$$x = E \cdot q \quad (31)$$

where $$x = (\Delta\theta 1, \Delta\theta 2, \ldots, \theta\Delta 6, \Delta\dot{\theta} 1, \Delta\dot{\theta} 2, \ldots, \Delta\dot{\theta} 6)^t$$
$$q = (\phi, \Delta q^2, \ldots, \Delta q^6, \dot{\phi}, \Delta\dot{q}^2, \ldots, \Delta\dot{q}^6)^t$$

$$E = \begin{pmatrix}
1 & -1 & -1 & 0 & 0 & 0 & 0 & 0 & 0 & 0 & 0 \\
1 & 0 & -1 & 0 & 0 & 0 & 0 & 0 & 0 & 0 & 0 \\
1 & 0 & 0 & 0 & 0 & 0 & 0 & 0 & 0 & 0 & 0 \\
1 & 0 & 0 & 1 & 0 & 0 & 0 & 0 & 0 & 0 & 0 \\
1 & 0 & 0 & 1 & 1 & 0 & 0 & 0 & 0 & 0 & 0 \\
1 & 0 & 0 & 1 & 1 & 1 & 0 & 0 & 0 & 0 & 0 \\
0 & 0 & 0 & 0 & 0 & 0 & 1 & -1 & -1 & 0 & 0 & 0 \\
0 & 0 & 0 & 0 & 0 & 0 & 1 & 0 & -1 & 0 & 0 & 0 \\
0 & 0 & 0 & 0 & 0 & 0 & 1 & 0 & 0 & 0 & 0 & 0 \\
0 & 0 & 0 & 0 & 0 & 0 & 1 & 0 & 0 & 1 & 0 & 0 \\
0 & 0 & 0 & 0 & 0 & 0 & 1 & 0 & 0 & 1 & 1 & 0 \\
0 & 0 & 0 & 0 & 0 & 0 & 1 & 0 & 0 & 1 & 1 & 1
\end{pmatrix}$$

Therefore, it is possible, for example, to use Equation 31 (the conversion equation) to convert Equation 24 to Equation 32.

$$u = -(Kx \cdot E) \cdot q = -Kq \cdot q \quad (32)$$

Equation 32 shows the calculation of the control input u from the inclination angle of the main unit and the shift (deviation) of the joint angle. A look at the entries making up the matrix E shows that there are a large number of 1 entries in the inclination angle and inclination angular velocity columns. This, together with the fact that since the joint angle shift is equal to the servo system deviation and the servo system acts to reduce the deviation, gives the Equation 33 enabling the control input u to be readily calculated solely form the inclination and inclination angular velocity of the main unit 24.

$$u = -K\Phi \cdot (\Phi, \dot{\Phi})^t \qquad (33)$$

Figure 7:
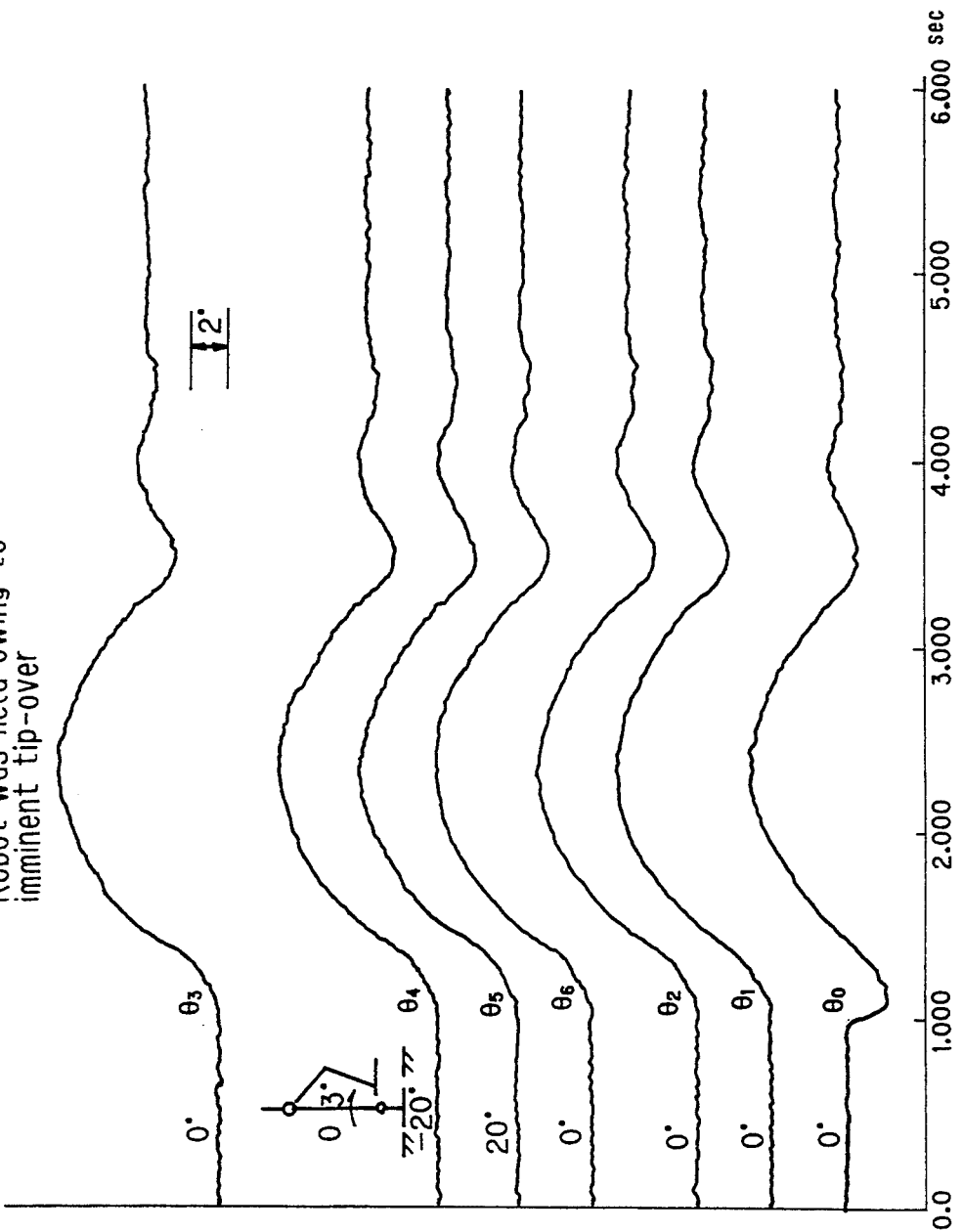
FIG. 7 is an experimental datum showing the response of the individual link angles when, with the robot in the one-leg support state, the ankle joint angle of the robot varied by 3° forward and specifically relating to the joint angle servo control alone.
Figure 8:
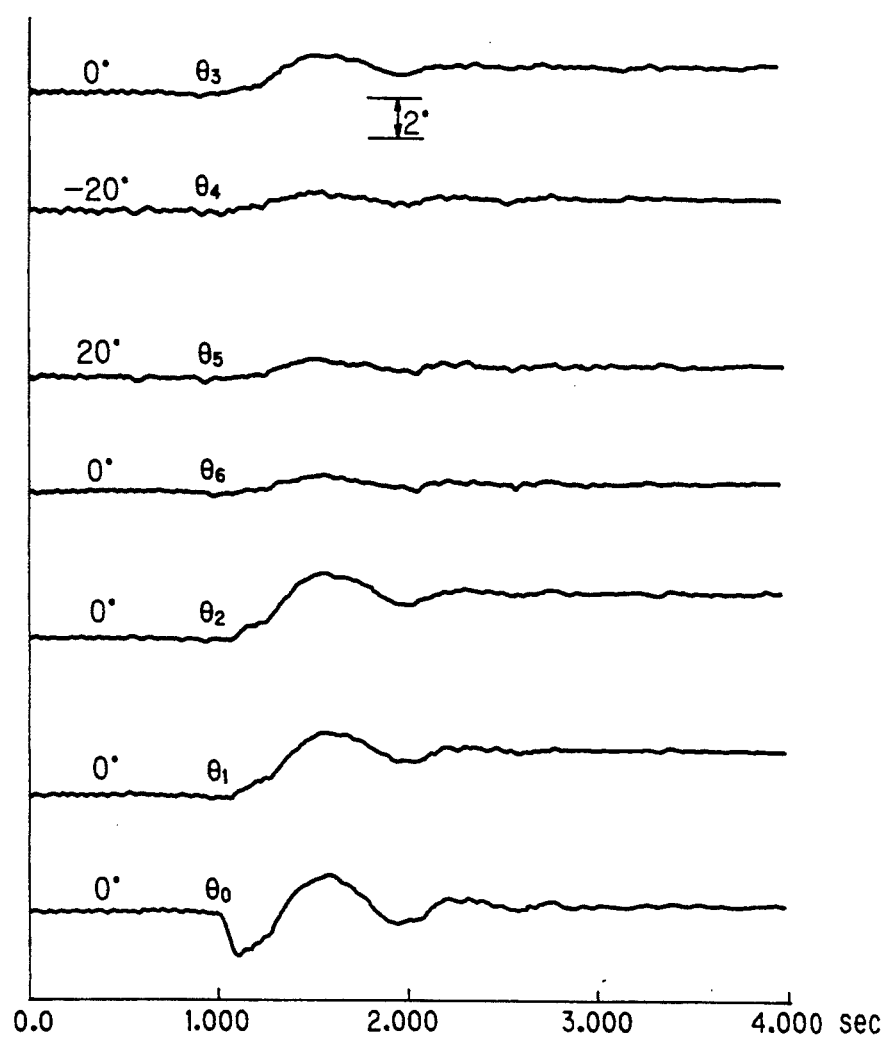
FIG. 8 is an experimental datum, similar to FIG. 7, but relating to the stabilization control according to Equation 33.
Figure 9:
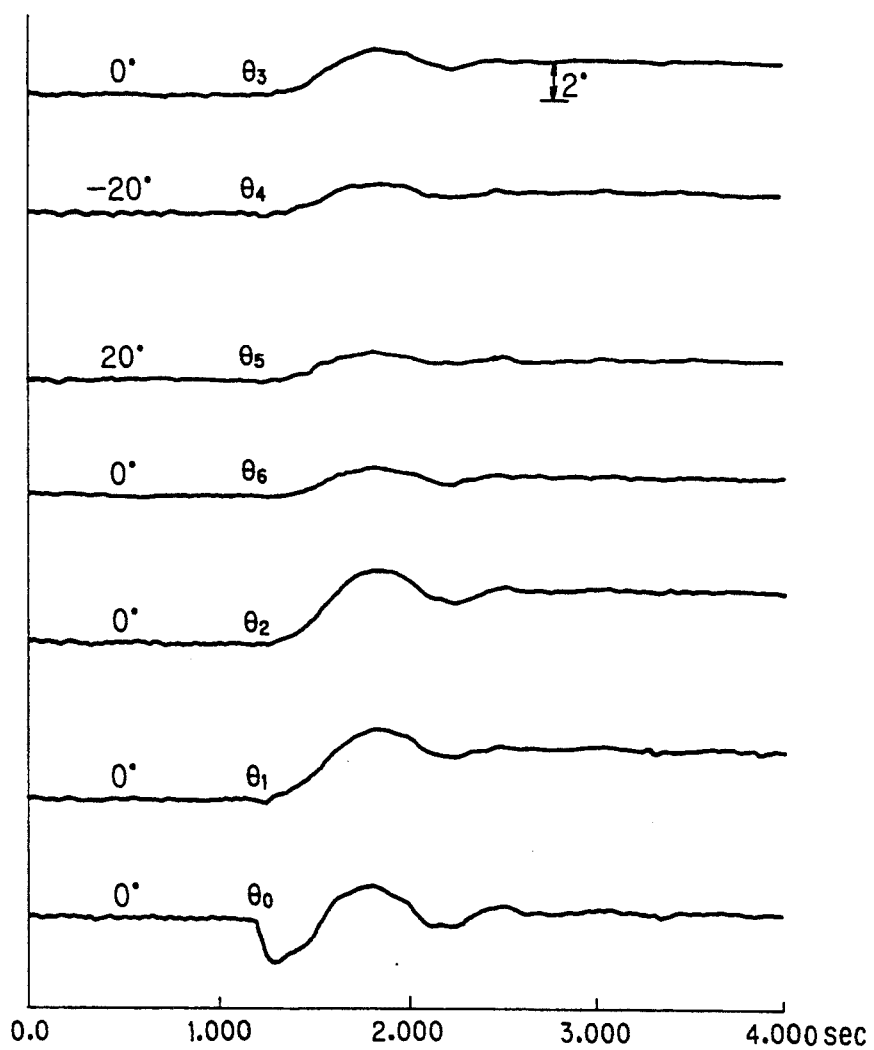
FIG. 9 is an experimental datum, similar to FIG. 8, but relating to that according to Equation 32.
Figure 10:
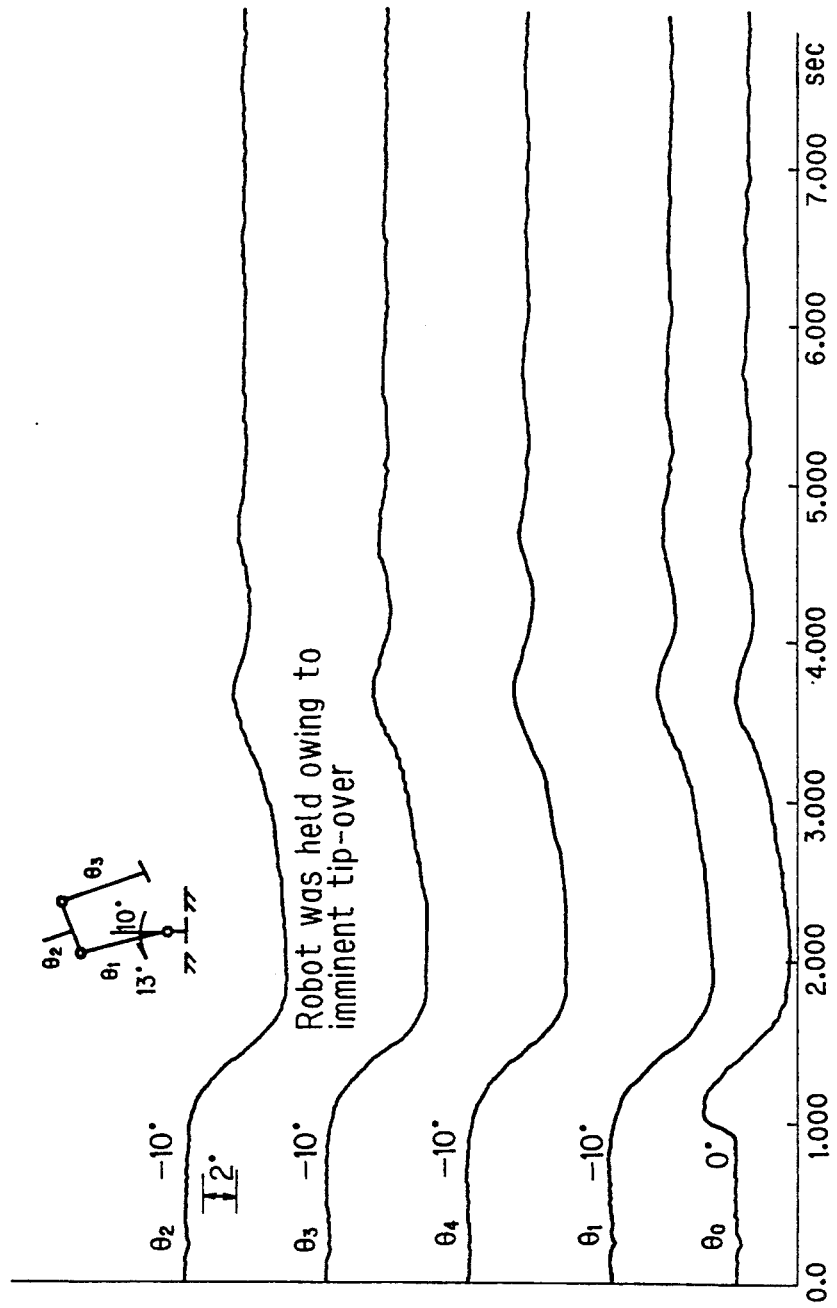
FIG. 10 is an experimental datum, similar to FIG. 7, but showing the case where the ankle joint is tilted by 3° in the left/right direction and relating to the joint angle control alone.
Figure 11:
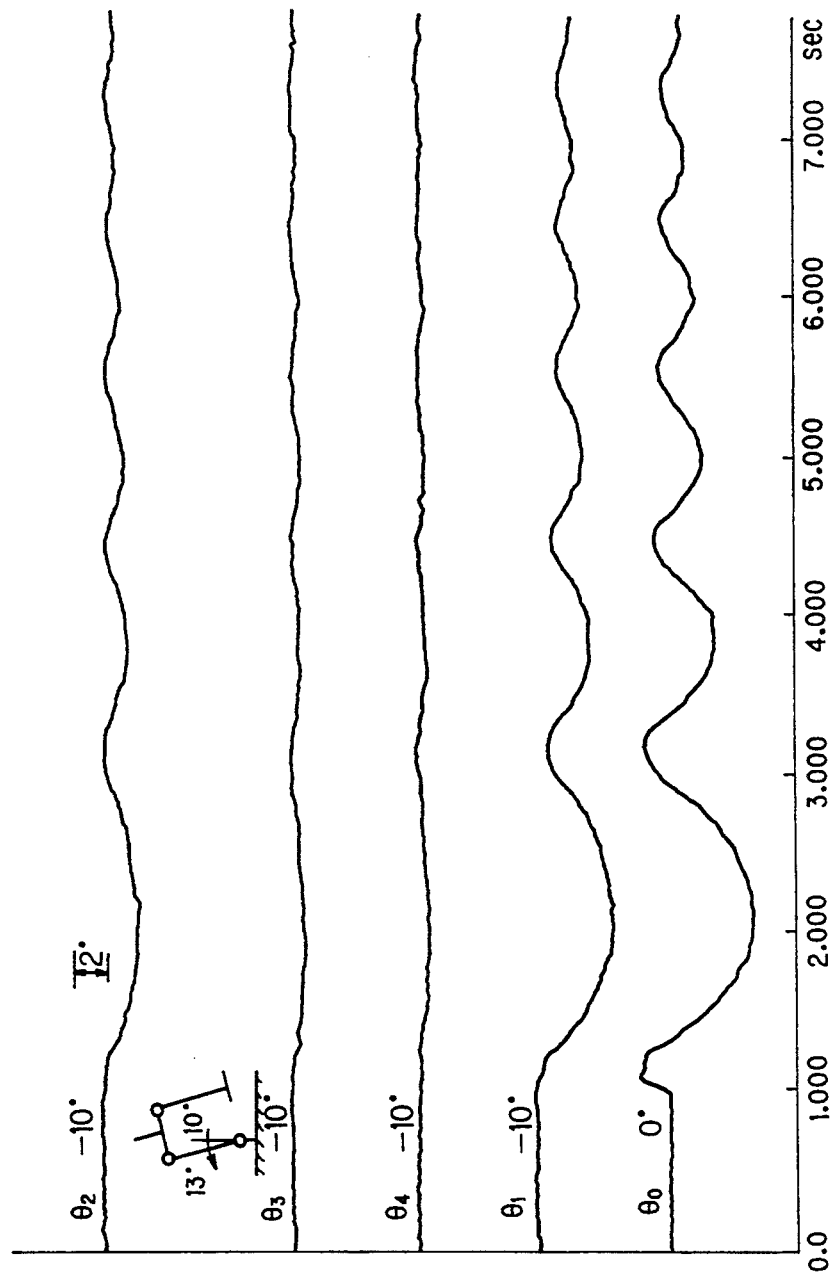
FIG. 11 is an experimental datum, similar to FIG. 10, but showing that relating to the stabilization control according to Equation 32.

FIGS. 7-11 show experimental data. Even when these data were used for calculating the control input u using the Equation 33, it was found that the control system was stable and that the eigenvalue determining the response of the control system differed little from that when Equation 32 was used. This will be explained in more detail. FIGS. 7-9 indicate experimental data showing the response of the individual link angles when, with the robot in the one-leg support state, the ankle joint angle of the supporting leg was varied stepwise by 3° forward, FIG. 7 relating to the joint angle servo control alone, FIG. 8 to the stabilization control according to Equation 33, and FIG. 9 to the stabilization control according to Equation 32. FIGS. 10 and 11 show similar experimental data in the case of tilting the ankle joint by 3° in the left/right direction, FIG. 10 relating to the joint angle control alone and FIG. 11 to the stabilization control according to Equation 32. These experimental results clearly show that there is little difference in response between Equations 32 and 33. It was moreover found that the robot did not tip over under control based on either of these Equations, whereas an overreaction caused it to tip over under control by the joint angle servos alone.

In addition, Equation 27 is also appropriate and can be simplified in exactly the same manner.

Based on the foregoing, the determination of the control values will now be explained with reference to the flow charts of FIGS. 12-14. (These flow charts assume that in the walking state transition diagram of FIG. 15 the walking begins with the right foot, shifts to normal walking from the third step and terminates with the left foot. Following these transitions over time, they are divided into one for the one-leg support periods (FIG. 12), one for the compliance control periods (at the time of free leg footfall) (FIG. 13) and one for the two-leg support periods (FIG. 14)).

Figure 12:
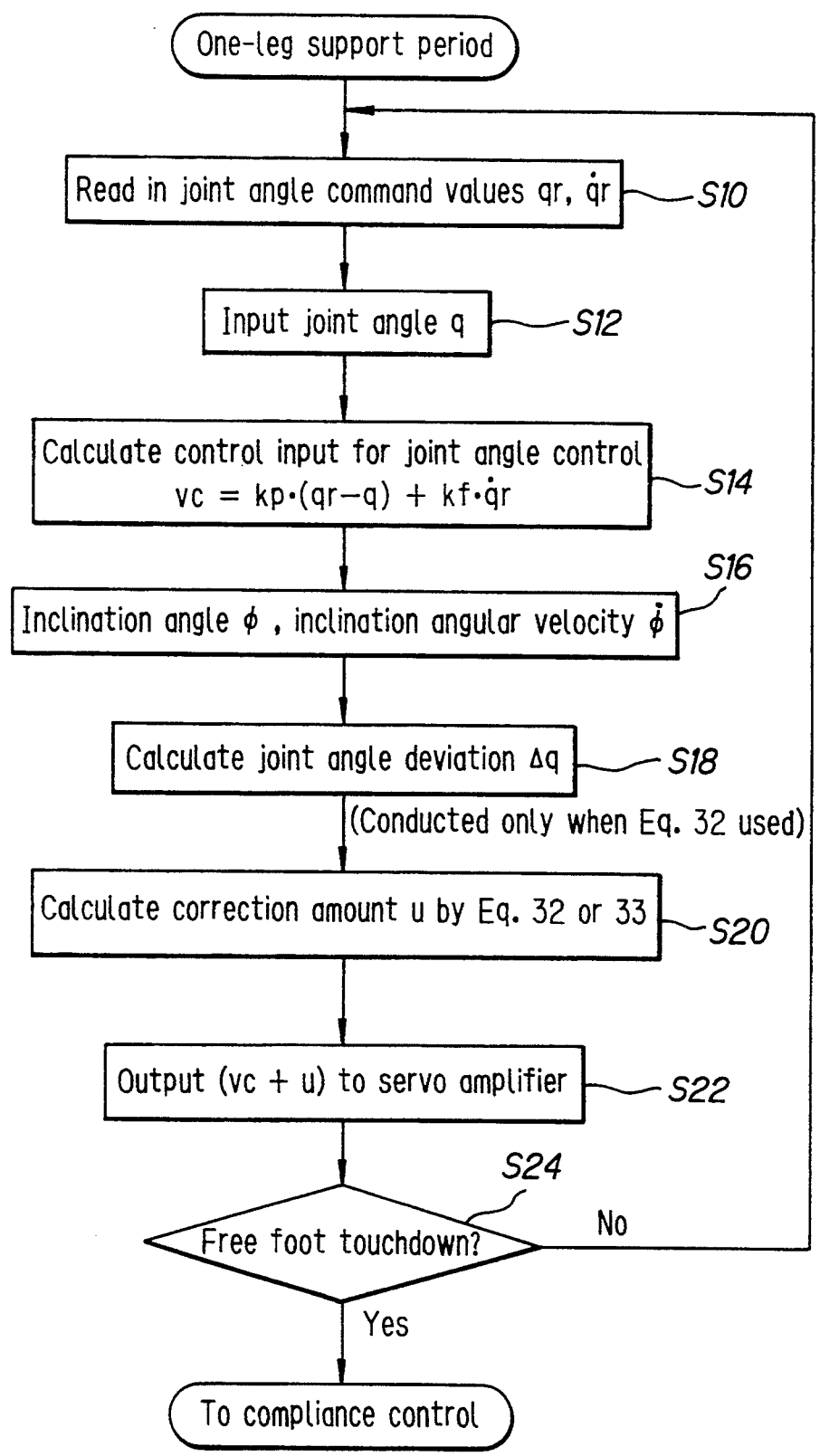
FIG. 12 is a flow chart showing the operation of the control according to the first embodiment in the one-leg support period.

The flow chart of FIG. 12 for one-leg support period control value determination starts with step S10 in which the joint angle command values qr and q(with dot)r are read. The link angles Θr (the absolute angles mentioned earlier; see FIG. 4) are stored in the ROM 66 of the control unit 26 of the robot 1 as the walking pattern. This pattern is successively converted into joint angle qr and joint angular velocity q(with dot)r (both relative angles) coordinates. Among these converted values, step S10 reads the ones for the first of the 12 joints (at time t).

Control then passes to step S12 in which the actual angle q for the joint concerned is read in, to step S14 in which the control input of the joint angle servo system is calculated using the equation shown. Control then passes to step S16 in which the inclination angle Φ and the inclination angular velocity Φ(with dot) are read in, to step S18 in which the joint angle deviation delta q between the actual angle q and the target angle qr is calculated, and to step S20 in which the correction amount u is calculated using Equation 32 or 33. (Step S18 is skipped when Equation 33 is used.) The correction amount u is also calculated in the form of a servo motor velocity command value. Next, in step S22, the value calculated in step S14 is added to the value calculated in step S20 and the result is output to the servo amplifier. Up to the time that it is found that the foot of the free leg has landed at the following step 24, the control value for the succeeding joint is calculated in the same way. When determination of the control values for all twelve joints has been completed, the same procedure is repeated at time t+1. Landing of the foot of the free leg is detected by the touchdown switch 38.

It is important to note here that priority is established among the joints in connection with output to the servo amplifier in step S22. Specifically, the joints are assigned priority in the order of the ankle joints 18, 20R (L) of the supporting leg, knee joint 16R (L) of the supporting leg, hip joints 10, 12, 14R (L) of the supporting leg, hip joints 10, 12, 14 L (R) of the free leg, knee joint 16 L (R) of the free leg and ankle joints 18, 20L (R) of the free leg, and the control input are added in this order. In other words, a joint making a larger contribution to stable attitude maintenance is assigned a higher priority. When time is limited, therefore, addition of the control input u may, for example, be conducted only for the ankle joint and the knee joint of the supporting leg. When adequate time is available, it is of course conducted in the stated order for all of the joints.

Figure 13:
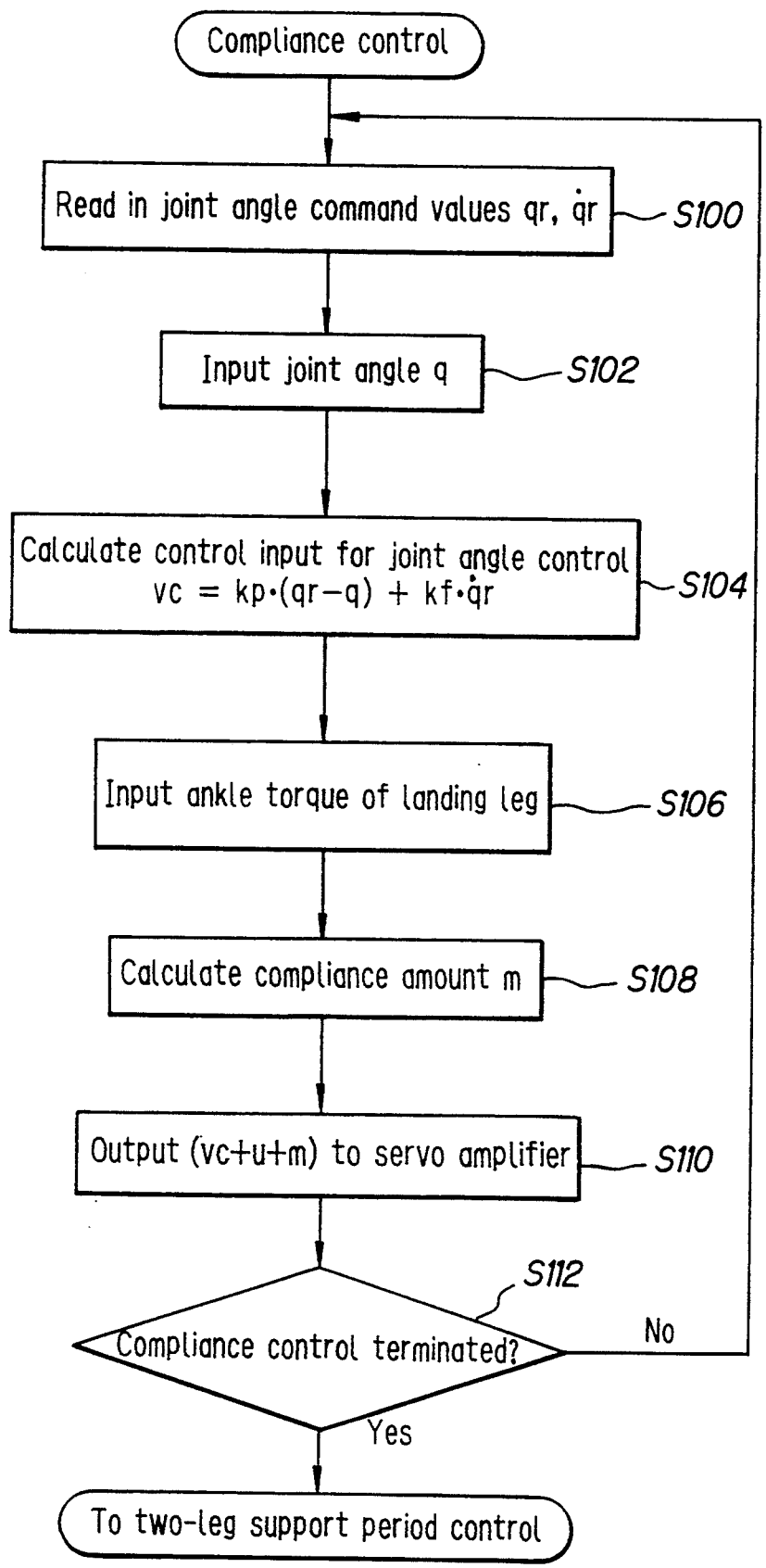
FIG. 13 is a flow chart, similar to FIG. 12, but showing that in the compliance control period.
Figure 32:
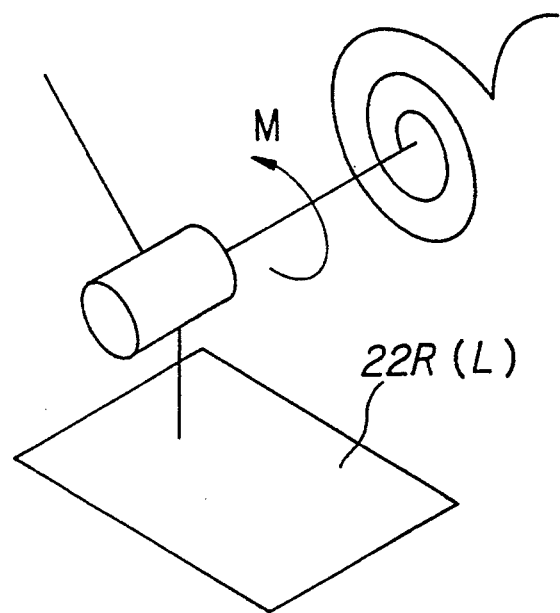
FIG. 32 is an explanatory view illustrating the principle of the virtual compliance control referred to in the flow chart of FIG. 27.

When it is found in step S24 of the flow chart of FIG. 12 that the free foot has landed, a switch is made to footfall period compliance control according to the flow chart of FIG. 13. In steps S100 to S104 of this flow chart, the servo motor control values are calculated in the same manner as described above in connection with FIG. 12. Control then passes to step S106 in which the ankle torque acting on the free leg landed is read in from the six-dimensional force and torque sensor 36 and to step S108 in which the compliance amount m is calculated. This is achieved by the so-called virtual compliance control method in which impedance control is realized through resolved motion rate control (this will be later explained with reference to FIG. 32). Control then passes to step S110 in which the sum of the servo control value vc, the virtual compliance control value m and the correction amount u are output to the servo amplifier and to step S112 in which the same steps are successively repeated for the respective joints until it is found that the compliance control has been terminated. Whether or not it has terminated is decided from whether or not a prescribed time period has lapsed following touchdown of the foot. The value calculated in step 20 of the flow chart of FIG. 12 is stored in memory and used as the correction amount u in step S110.

Figure 14:
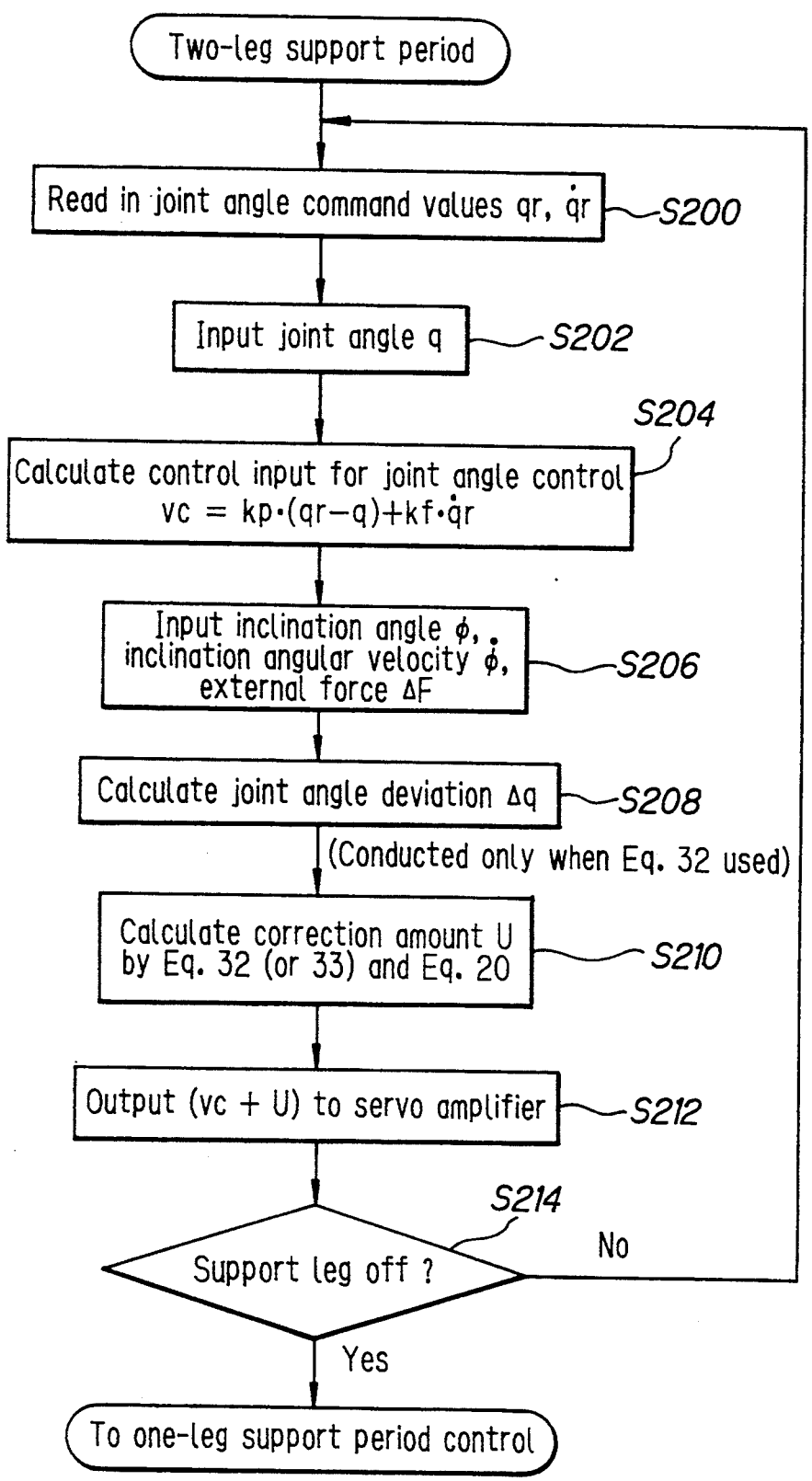
FIG. 14 is a flow chart, similar to FIG. 13, but showing that in the two-leg support period.
Figure 15:
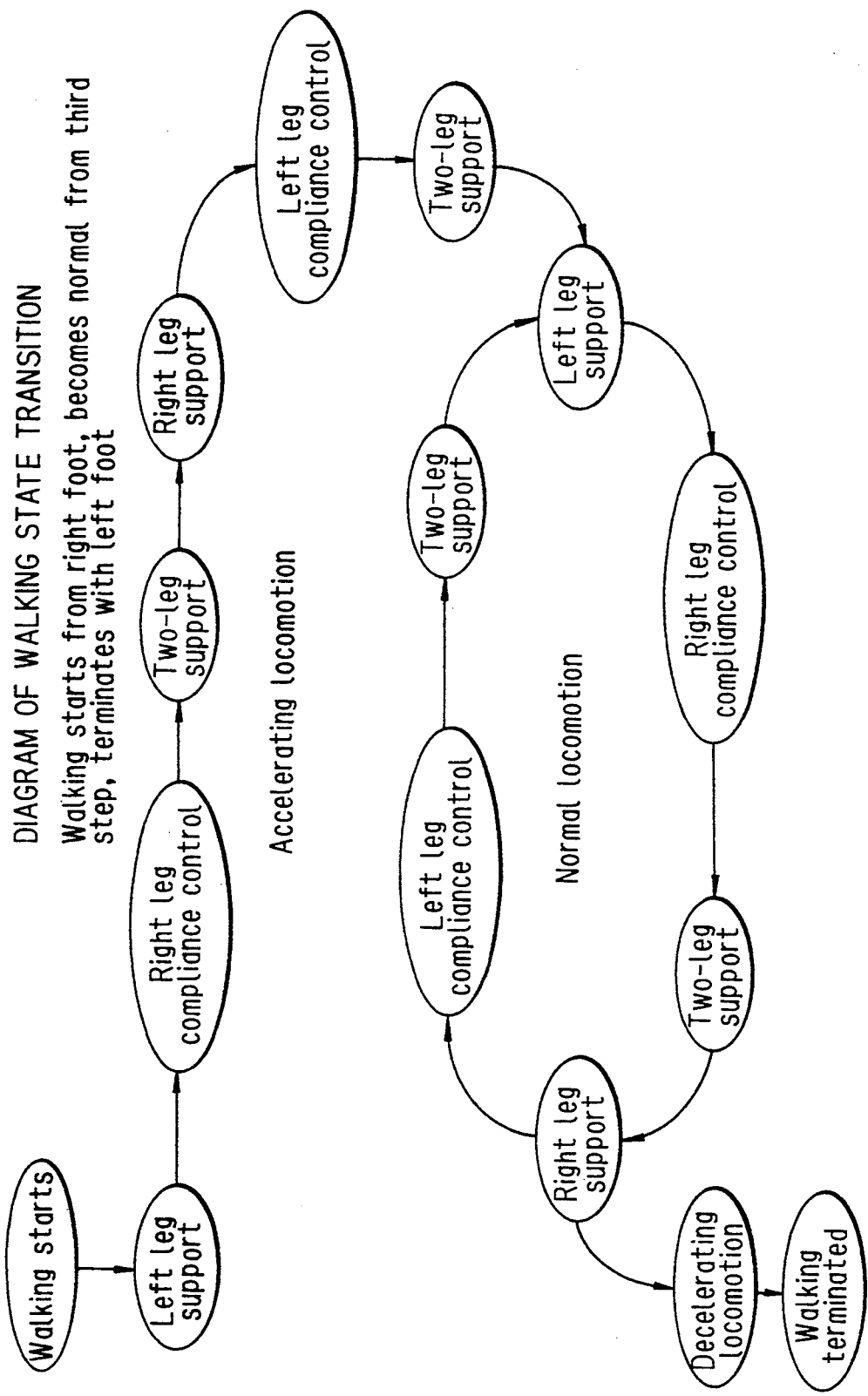
FIG. 15 is a walking state transition diagram illustrating the assumption of the operation of the control of FIGS. 12 to 14.

When it is found in step S112 of the flow chart of FIG. 13 that the compliance control has terminated, the control values for the two-leg support period are determined in steps S200 to S214 of the flow chart of FIG. 14. Except for the point that the calculation of the correction amount U in step S210 uses Equation 20 additionally, the procedure is the same as that of the flow chart of FIG. 12. (If delta F can be considered to be a disturbance, then instead of precisely calculating the control input by the use of Equation 20 as just described, it is possible to calculate it using Equation 32 or 33 alone. In step S20 of the flow chart of FIG. 12, on the other hand, when an external force acts on the free leg, Equation 20 can be added to the equations usable for the calculation As regards determining the weighting of the evaluation function J, where the performance function J of Equation 23 is represented specifically for the case of fore/aft motion, it is generally done in the manner of Equation 34.

$$J = \int_0^\infty (q1 \cdot \Delta\Theta1^2 + q2 \cdot \Delta\Theta2^2 + q3 \cdot \Delta\Theta3^2 + q4 \cdot \Delta\Theta4^2 + \quad (34)$$
$$q5 \cdot \Delta\theta t^2 + q6 \cdot \Delta\theta 6^2 + r1 \cdot u1^2 + r2 \cdot u2^2 + r3 \cdot u3^2 + r4 \cdot$$
$$u4^2 + r5 \cdot u5^2 + r6 \cdot u6^2)dt$$

The performance function J represents the sum of the squares of the weights of the attitude shift delta $\theta i$ and the control input ui. In accordance with optimum regulator theory, the feedback gain is calculated so as to make the attitude shift of a heavily weighted term smaller than that of a lightly weighted term. Therefore, different feedback gains are calculated depending on the weighting, and differences arise between the time response of the attitude shift correction. The optimum regulator theory does not define a fixed method for selecting the manner of weighting. Generally, it is often selected through a simulation or an experiments.

In consideration of the special characteristics of biped locomotion, this invention selects weights Q and R. This will be explained with respect to a case in which it is desired to control the footfall position with high accuracy, as during stair climbing and descent.

Consideration will be given to the case shown in FIG. 16, in which shifts delta x and delta y arise with respect to the target toe position (x, y) of the free foot. Here, x, y, delta x and delta y can be expressed by Equations 35–38.

$$x = l1 \cdot \sin\theta 1 + l2 \cdot \sin\theta 2 + l4 \cdot \sin\theta 4 + l5 \cdot \sin\theta 5 + l6 \cdot \sin\theta 6 \quad (35)$$

$$y = l1 \cdot \cos\theta 1 + l2 \cdot \cos\theta 2 + l4 \cdot \cos\theta 4 + l5 \cdot \cos\theta 5 + l6 \cdot \cos\theta 6 \quad (36)$$

$$\Delta x = l1 \cdot \cos\theta 1 \cdot \Delta\theta 1 + l2 \cdot \cos\theta 2 \cdot \Delta\theta 2 + l4 \cdot \cos\theta 4 \cdot \Delta\theta 4 + l5 \cdot \cos\theta 5 \cdot \Delta\theta 5 + l6 \cdot \cos\theta 6 \cdot \Delta\theta 6 \quad (37)$$

$$\Delta y = -l1 \cdot \sin\theta 1 \cdot \Delta\theta 1 - l2 \cdot \sin\theta 2 \cdot \Delta\theta 2 - l4 \cdot \sin\theta 4 \cdot \Delta\theta 4 - l5 \cdot \sin\theta 5 \cdot \Delta\theta 5 - l6 \cdot \sin\theta 6 \cdot \Delta\theta 6 \quad (38)$$

Figure 16:
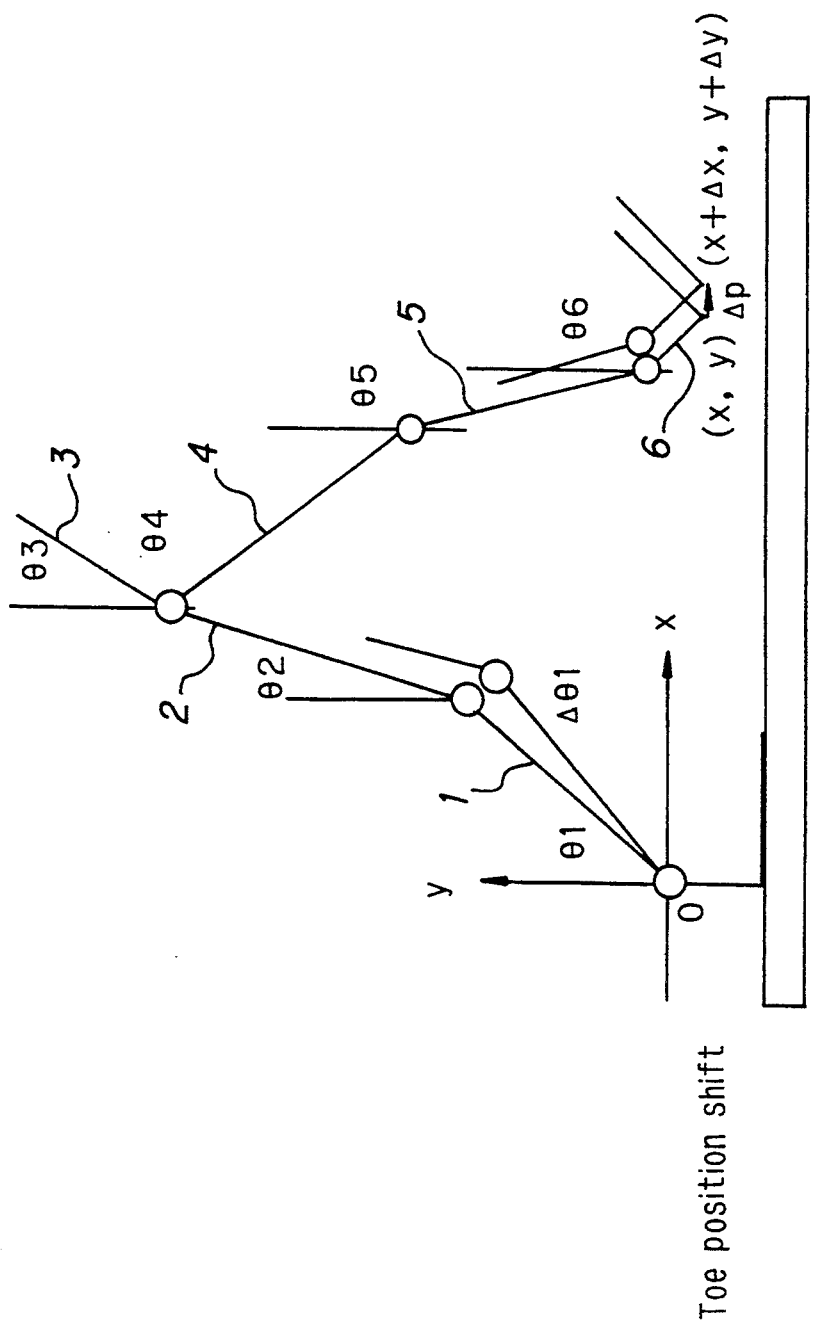
FIG. 16 is an explanatory view showing that a shift arises with respect to a target toe position of the free foot.

As shown in FIG. 16, the positional shift delta p of the shifts delta x, delta y from the target toe position of the free foot can be expressed as the sum of squares in the manner of Equation 39.

$$\Delta p^2 = \Delta x^2 + \Delta y^2 \leq ((l1 \cdot \sin\theta 1)^2 + (l1 \cdot \cos\theta 1)^2) \cdot \Delta\theta 1^2 + \quad (39)$$
$$((l2 \sin\theta 2)^2 + (l2 \cdot \cos\theta 2)^2) \cdot \Delta\theta 2^2 + ((l4 \cdot \sin\theta 4)^2 +$$
$$(l2 \cdot \cos\theta 4)^2) \cdot \Delta\theta 4^2 + ((l5 \cdot \sin\theta 5)^2 + (l2 \cdot \cos\theta 5)^2) \cdot$$
$$\Delta\theta 5^2 + ((l6 \cdot \sin\theta 6)^2 + (l2 \cdot \cos\theta 6)^2) \cdot \Delta\theta 6^2$$
$$= a1 \cdot \Delta\theta 1^2 + a2 \cdot \Delta\theta 2^2 + a4 \cdot \Delta\theta 4^2 +$$
$$a5 \cdot \Delta\theta 5^2 + a6 \cdot \Delta\theta 6^2$$

As can be seen from these equations, the shift delta $p^2$ from the target position is proportional to the coefficients relating to the attitude shifts delta $\theta i$ of the respective links. In other words, by reducing the magnitude of the attitude shifts delta $\theta i$ in the order of from larger to smaller coefficients, it is possible to effectively reduce the position shift delta $p^2$. On the other hand, the larger is the weighting of an attitude shift delta $\theta i$, the smaller the performance function J can be made. Therefore, by selecting the performance function J according to Equation 40, the toe position shift can be optimally corrected. In other words, when it is desired to achieve touchdown precisely at a prescribed position, the weighting is not made the same for all links but is varied depending on the contribution of the link to the toe position shift. For example, if in Equation 34 it is desired to make the change in delta $\theta 1$ small, it suffices to make the weight q1 large. If in view of the maximum torque produced by the actuator it is desired to increase the torque produced by u2, it suffices to make r2 small. Thus, in addition to the stabilization control, it is possible to realize optimum (most effective) control of, for example, the toe position, by changing the magnitude of the weights Q and R depending on the desired optimum control position (here referring to a position in the work coordinate system, not a position in a joint coordinate system such as a joint angle position coordinate system). Moreover, the selection can be applied not only to the toe position, but also to any other position including the robot's center of gravity.

$$J = \int_0^\infty (q7 \cdot \Delta p^2 + q3 \cdot \Delta\theta 3^2 + r1 \cdot u1^2 + r2 \cdot u2^2 + r3 \cdot \quad (40)$$
$$u3^2 + r4 \cdot u4^2 + r5 \cdot u5^2 + r6 \cdot u6^2)dt$$
$$= \int_0^\infty (k \cdot (a1 \cdot \Delta\theta 1^2 + a2 \cdot \Delta\theta 2^2 + a4 \cdot \Delta\theta 4^2 + a5 \cdot \Delta\theta 5^2 +$$
$$a6 \cdot \Delta\theta 6^2) + q3 \cdot \Delta\theta 3^2 + r1 \cdot u1^2 + r2 \cdot u2^2 + r3 \cdot u3^2$$
$$+ r4 \cdot u4^2 + r5 \cdot u5^2 + r6 \cdot u6^2)dt$$

In this embodiment, the control unit of a biped walking robot equipped with a joint angle servo system determines the deviation between each target angle of a walking pattern established in advance and the actual angle as an absolute angle, determines a control input u as a function of the deviation, and adds the control input u to the servo control input. As a result, the robot can maintain a stable attitude at all times, even during walking over a terrain with irregularities not anticipated by the walking pattern and can achieve smooth locomotion without need to use a high-speed computer for nonlinearity compensation even with respect to a walking pattern that loses linearity. In addition, the system is configured so as not only to enable the control input u to be determined with high precision as a function of the amount of change in the external force acting on the free leg but also to enable it to be determined simply and easily from the inclination angle and inclination angular velocity of the robot's main unit.

Figure 17:
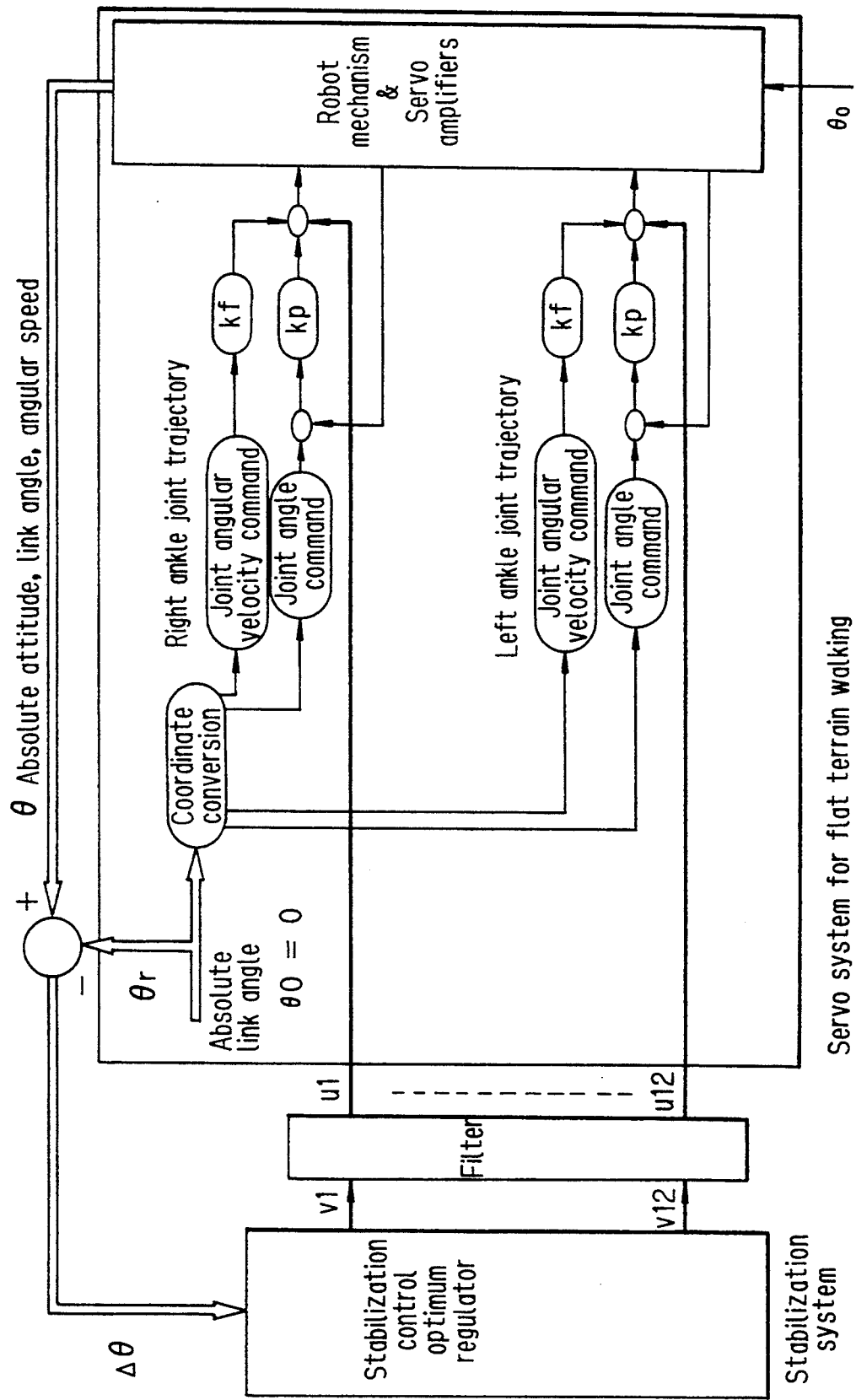
FIG. 17 is a block diagram showing a second embodiment of the invention in which gains are imparted with frequency characteristics.
Figure 18:
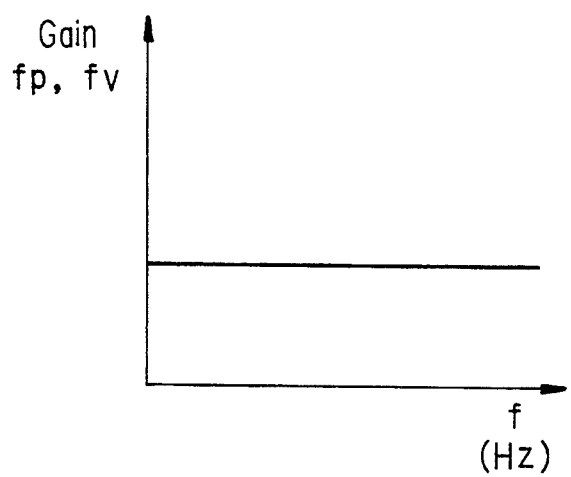
FIG. 18 is a graph showing the gain made constant with respect to frequency.
Figure 19:
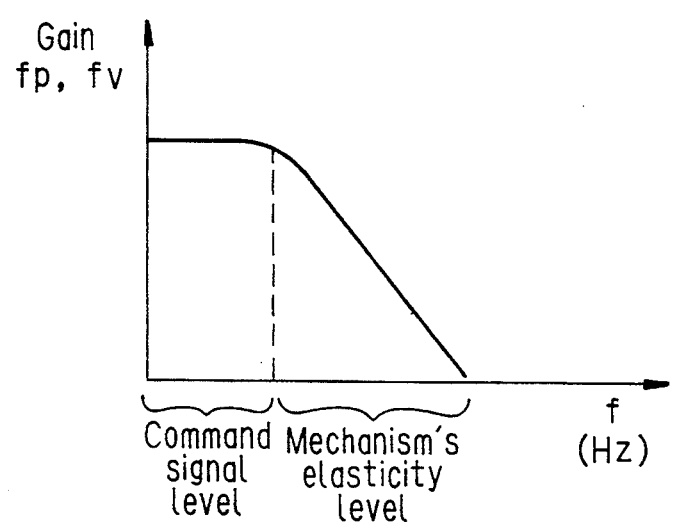
FIG. 19 is a graph showing the gain made variable with respect to the frequency.

FIG. 17 is a block diagram of a second embodiment of the invention and shows a stabilization control system similar to that of the first embodiment shown in FIG. 4. In this embodiment the gain Kx and gains Kq and K$\Phi$ are imparted with frequency characteristics. Differently from the first embodiment in which, as shown in FIG. 18, the gain is maintained constant irrespective of frequency, in the second embodiment it is decreased with increasing frequency, as shown in FIG. 19.

That is, as a precaution against the occurrence of disturbance, it is necessary to increase the gain so as to improve the stability against disturbance by quickening the response thereto. When the link response is increase by raising the gain, however, high frequency vibration occurs in the links. When the gain is increased further, the high frequency is amplified in the feedback loop, giving rise to oscillation. This is because the mathematical model expressed by Equation 1 holds only in the low-frequency range, such as that of a rigid model, and is not capable of accurately expressing states extending up to the high-frequency range in which various influences caused by the elasticity or compliance, the play and the flexibility of the links occur. It is, however, extremely difficult to express states extending up to the high-frequency range accurately in a mathematical model. Even if they could be expressed, the model would become so highly complex as to require the use of an expensive, large-capacity computer, thus making it impractical.

Since the cause of the oscillation is that the high-frequency signal does not attenuate but is amplified, it suffices to attenuate the high-frequency signal. Therefore, in this embodiment the feedback gain Kx, or Kq, KΦ, is imparted with frequency characteristics. Specifically, as shown in FIG. 19, a relatively high gain is set at the command signal level (low frequency range) and a relatively low gain is set in the high-frequency region where the links exhibit elasticity. As shown in FIG. 17, the specific means for this is a high-frequency cut filter inserted into the feedback loop. The state equation of this filter can be expressed as Equation 41. By appropriately selecting Af, Bf and Cf at the design stage, it is possible to arbitrarily determine the cutoff frequency.

$$\dot{z} = Af \cdot z + Bf \cdot v$$

$$u = Cf \cdot z \tag{41}$$

where
z: filter state variable.

In this embodiment, the cutoff frequency is varied as a function of the weight of the payload in the calculation of the correction amounts u and U in step S20 of FIG. 12 and step S210 of FIG. 14. This is because the natural frequency of the robot mechanism changes when an object is attached to its upper portion and, as a result, the oscillation frequency also changes. This adjustment need not be made by use of software method but can instead be easily achieved by use of an electrical filter.

In this embodiment, the feedback gain of the stabilization control system (optimum regulator) is set to be small in the high-frequency region, the absolute value of the deviation between each target angle of a walking pattern established in advance and the actual angle is determined, and control input u is determined as a function of the deviation and added to the servo operation amount. Up to the limit beyond which oscillation occurs, therefore, higher stability can be achieved than in the case where no filter is added to the system. In addition, the robot can maintain a stable attitude at all times, even during walking over a terrain with irregularities not anticipated by the walking pattern and can achieve smooth locomotion without need to use a high-speed computer for nonlinearity compensation even with respect to a walking pattern that loses linearity. In addition, the system is configured so as not only to enable the control input u to be determined with high precision as a function of the amount of change in the external force acting on the free leg but also to enable it to be determined simply and easily from the inclination angle and inclination angular velocity of the robot's main unit.

While in the first and second embodiments described in the foregoing the control input u was added at the place indicated by the symbol (a) in FIG. 3, it can instead be added at the places designated by the symbol (b) or the symbol (c).

Further, while the walking pattern was designed in terms of absolute angles as shown in FIG. 4, the embodiment is not limited to this arrangement and the walking pattern can instead be designed in terms of relative angles. In this case, however, since the actual angles are detected as absolute angles, it is necessary to determine the absolute angles by appropriate coordinate conversion.

A third embodiment of the invention will then be explained. The third embodiment aims to provide a system wherein a robot model is mathematically approximated to a degree of accuracy approaching that of a five link model, notwithstanding that it is maintained as a three-link model.

Figure 21:
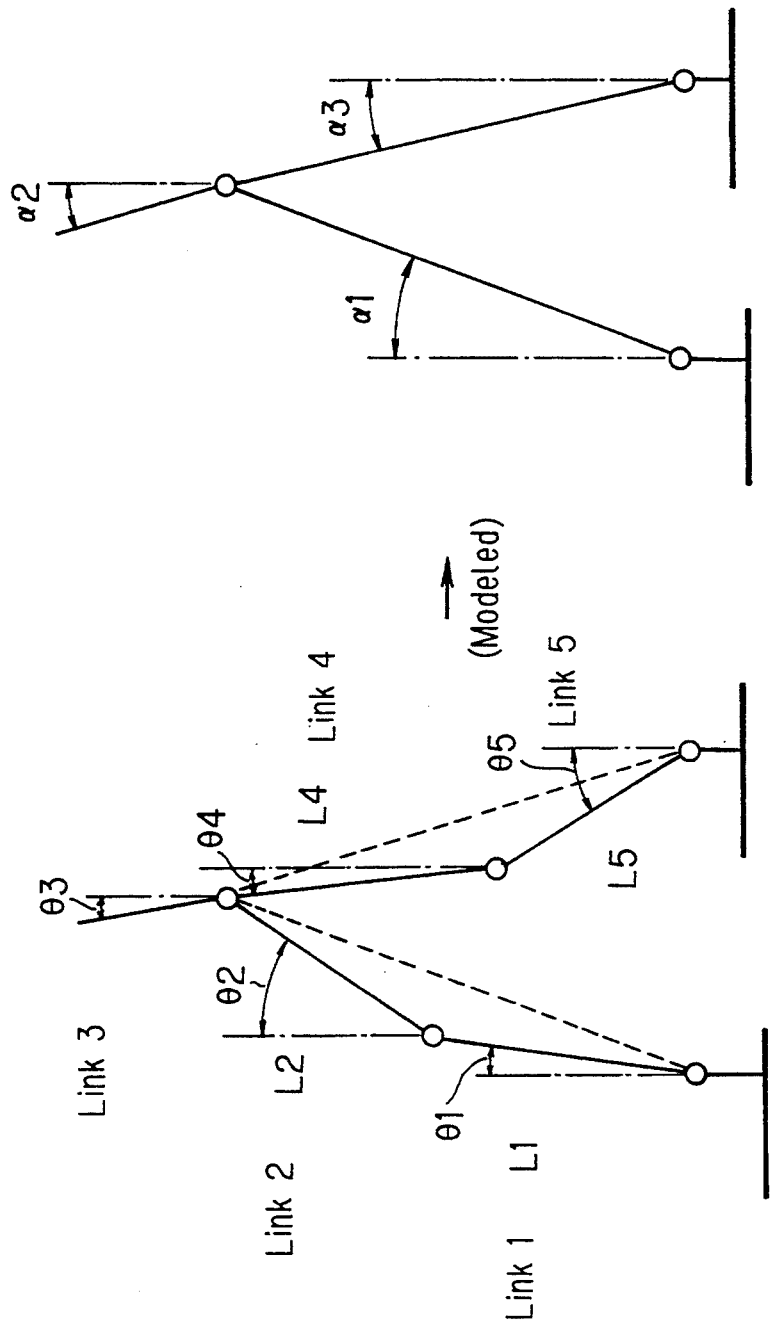
FIG. 21 is an explanatory view, similar to FIG. 20, but showing a robot model used in a third embodiment of the invention.
Figure 22:
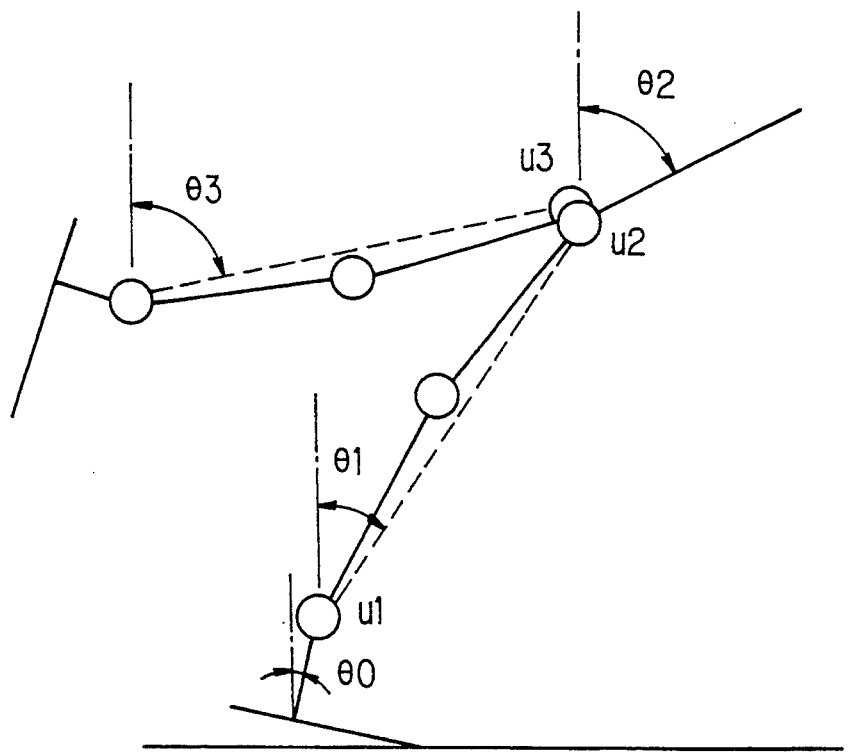
FIG. 22 is an explanatory view, similar to FIG. 21, but showing the robot model more specifically.

For that purpose, as illustrated in FIG. 21, the leg links are virtually defined in the fore/aft direction by dashed lines connecting the hip joints and the ankle joint. More specifically, the robot is modeled as illustrated in FIG. 22. In this case, the link angles before and after the modeling i.e., those illustrated in FIGS. 5 and 22, will be expressed Equation 42.

$$\theta 1 = atn\left(\frac{L1 \cdot \sin\theta 1' + L2 \cdot \sin\theta 2'}{L1 \cdot \cos\theta 1' + L2 \cdot \cos\theta 2'}\right) \tag{42}$$

$$\theta 2 = \theta 3'$$

$$\theta 3 = atn\left(\frac{L5 \cdot 5' + L6 \cdot \sin\theta 4'}{L5 \cdot \cos\theta 5' + L4 \cdot \cos\theta 4'}\right)$$

where
L1,L2,L4,L5: each link length.

The other features of the third embodiment are quite the same as those of the first embodiment.

Figure 20:
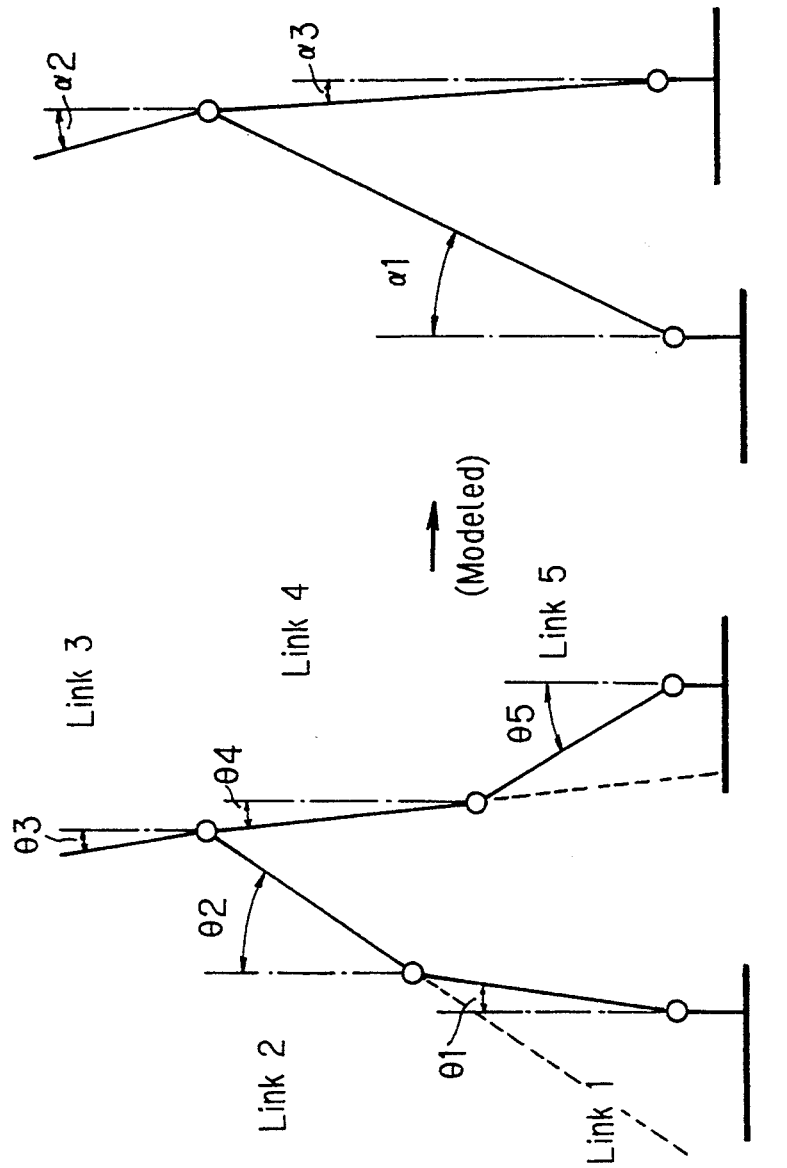
FIG. 20 is an explanatory view showing a robot model used in the assignee's prior art control.

In the third embodiment, the fore/aft model is created based on the definition that the absolute angle of the supporting leg is the angle of one side of a triangle whose other two sides are the links 1 and 2 and that the absolute angle of the free leg is defined to be one side of a triangle whose other two sides are the links 4 and 5. As a result, while still using only three links, it is possible to achieve modeling that much more accurately approximates the robot's fore/aft motion than does the method of FIG. 20. Specific advantages over the method of FIG. 20 are enumerated below. (These advantages become more pronounced with increased knee bending.)

First, the error in the touchdown position of the free foot can be reduced. Since the angles of both legs are defined as the angle of the line connecting the hip with the ankle, the angular error of the legs is zero insofar as the control error is zero. Since the error is limited to that in the length of the legs, the touchdown position is quite accurate. In the method according to FIG. 20, the control assumes that the touchdown position is on an extension of the thigh link and, therefore, where the leg angle difference in the method according to FIG. 21 is defined as delta Θ, an error of (leg length x sin (delta Θ/2)) occurs. If, for example, the leg length is 1 m and the knee angle is 10°, the touchdown position error can be held to 8 cm.

Since the stability limit of the control system increases, the control response can be improved. As was explained earlier with reference to the first embodiment which is also applicable to the third embodiment, an optimum regulator is used for increasing the stability of the control system. Thus, if there is an error in the modeling itself, the likelihood of oscillation occurring will not decrease but increase in the high frequency region. On the other hand, the feedback gain will determined, through simulations, while adjusting the relationship between the magnitude of the control input and the control amount response. If the modeling error is large, the desired response cannot be obtained. In the control according to this embodiment, however, since the modeling accuracy in enhanced by use of the configuration shown in FIG. 21, the effect mentioned above can be achieved.

Although the third embodiment was explained as a development of the first embodiment in which the control unit includes a joint angle servo system, the embodiment can also be effectively applied to the system disclosed in the assignee's earlier system, which does not include a joint servo system.

Moreover, the third embodiment was explained with reference to a legged robot, it can also be applied to any other robot whose links or linkages are placed horizontally on the ground like a snake.

Figure 23:
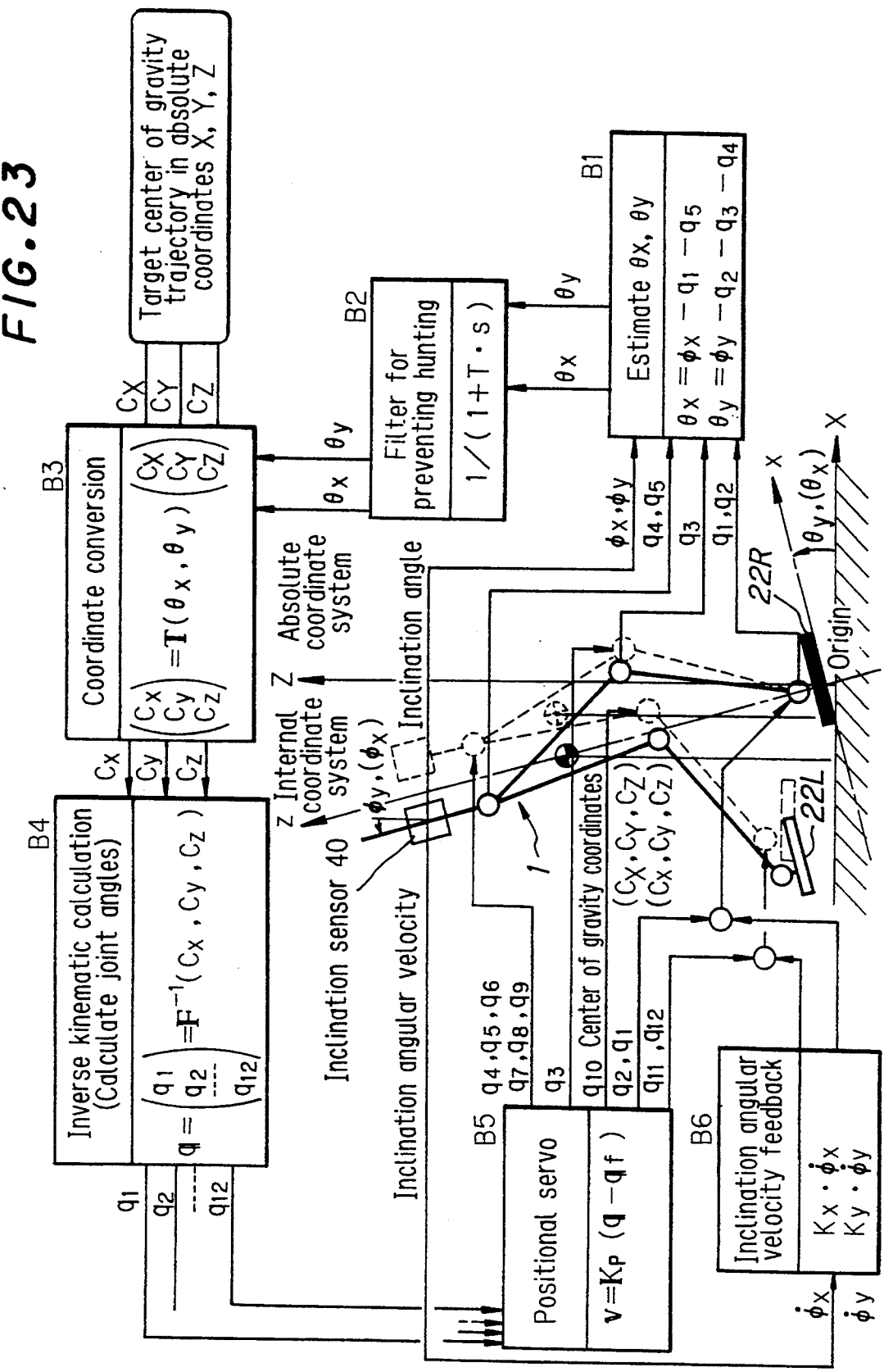
FIG. 23 is a block diagram showing a fourth embodiment of the invention.

FIG. 23 is a block diagram illustrating the operation of the control system according to a fourth embodiment of the invention. It should be noted here that the structure of the system itself is the same as that of the first embodiment.

FIG. 23 shows the control at the time the robot tilts in the fore/aft direction. Although the control in the left/right direction is not illustrated, it is exactly the same as the control described in the following. When the inclination angle is small, the three-dimensional inclination can be separated into fore/aft and right/left inclination angles. If it is large, three-dimensional coordinate conversion is used. In the interest of simplicity, the explanation will be made with respect to the case of a small inclination angle. In FIG. 23, an absolute coordinate system X-Y-Z is fixed with respect to the ground and an internal coordinate system x-y-z is fixed with respect to the sole of each foot 22R (L). The walking patterns or parameters (the trajectory parameters) determined in advance are the center of gravity, the center of gravity displacement's velocity, the foot positions and the foot position displacement's velocity.

Assume that one of the robots feet, e.g. the right foot 22R, has landed on an incline or terrain irregularity and, as a result, the robot has tilted as indicated by the solid lines in FIG. 23 (in which the broken lines indicate the target attitude). If the robot is static walking at this time, the center of gravity trajectory will shift off the foot 22R and the robot will be in danger of tipping over. On the other hand, if, with respect to the absolute coordinate system X-Y-Z fixed with respect to the ground, the center of gravity is in the target position indicated in broken lines, the robot will not tip over.

In the control according to the embodiment, the angles $\theta x$, $\theta y$ of the foot 22R are estimated in block B1. More specifically, the inclination sensor 40 is used to detect the inclination angular velocity $\dot{\Phi}x$ and $\dot{\Phi}y$ of the main unit 24 (the absolute angles relative to the direction of gravity; the subscripts indicate direction), the detected values are integrated to obtain the inclination angles $\Phi x$, $\Phi y$, and the angles $\theta x$, $\theta y$ of the foot 22R shown in the figure (absolute angles relative to the direction of gravity; the subscripts indicate direction) are estimated from the so-determined inclination angles and the joint angles qn detected by the rotary encoders (relative angles between links). The joint angles q are the angles of the twelve joints shown in FIG. 1 and the subscript n indicates the joint concerned.

Next, in block B2, only the low-frequency components of the foot angles $\theta x$, $\theta y$ are extracted by a low-pass filter. This is for preventing hunting caused by the robot's feedback loop when the estimated values include high-frequency vibration.

Next, in block B3, the foot angles $\theta x$, $\theta y$ are used as shown in the figure to convert the coordinates of the center of gravity in the absolute coordinate system X-Y-Z to coordinates in the internal coordinate system x-y-z fixed to the robot. In other words, the center of gravity trajectory in the absolute coordinate system is converted into a center of gravity trajectory in the internal coordinate system fixed to the robot.

Next, in block B4, the angles of the twelve joints are calculated in the illustrated manner by solving the inverse kinematic problem based on the converted center of gravity trajectory.

Next, in block B5, as was explained earlier in connection with FIG. 2, the calculated joint angles are output to the position servo system which controls the joint angles, whereby the center of gravity trajectory is controlled to enable the robot 1 to recover its initial attitude indicated by the broken lines.

Moreover, in block B6, the center of gravity velocity is approximated as the detected inclination angular velocity and the stability is enhanced by conducting feedback control only with respect to the ankle joints 18, 20R (L). More specifically, while it is preferable to control not only the position but also the displacement's velocity of the center of gravity, the processing is simplified by conducting this type of inclination feedback control locally. The actual manner in which the inclination feedback control is conducted is by adding to the angles of the ankles 18, 20R (L) (calculated in block B4) the product of the inclination angular velocities $\dot{\Phi}x$, $\dot{\Phi}y$ and gains Kx, Ky.

As explained in the foregoing, in this embodiment, when the foot angle deviates from that on flat terrain (zero degrees) owing to the foot stepping on an inclined or irregular part of the terrain, the foot angle is estimated from the output of the inclination sensor, coordinate conversion is conducted using the estimated foot angle, and the joint angles are control so as to keep the center of gravity trajectory from shifting from the target one predetermined in the absolute coordinate system fixed with respect to the ground. As a result, the center of gravity can be maintained on the prescribed trajectory and the attitude of the robot stabilized.

Although all twelve joints are controlled in the foregoing embodiment, it is alternatively possible to reduce the number of controlled joints for lightening the processing load.

Moreover, while the embodiment described in the foregoing relates to an example in which the only parameter among the predefined trajectory parameters that is controlled to a target value in response to the foot inclination angle is the center of gravity (center of gravity trajectory). However, the embodiment is not limited to this arrangement, and it is also possible to control the center of gravity displacement's velocity, or also to control the foot position and its displacement's velocity. In addition, it is also possible to control some position that is easier to ascertain than the center of gravity, such as the hip position.

Further, instead of estimating the foot inclination angle as described in the foregoing, it is possible to estimate the foot inclination angular velocity.

Also, although an example in which feedback control of the ankle is also carried out (in block B6) was described, this can be omitted in the case of low-speed walking.

Moreover, although there was described an example in which the walking pattern (trajectory parameters) is determined in advance, the embodiment is not limited to this arrangement and it is alternatively possible to use technology for determining the walking parameters in real time during locomotion.

Finally, a fifth embodiment will be described which is a development of the assignee's earlier system (U.S. Ser. No.: 799,367). The structure of the system is also the same as the first embodiment.

The operation of the control system according to the fifth embodiment will now be explained.

Figure 25:
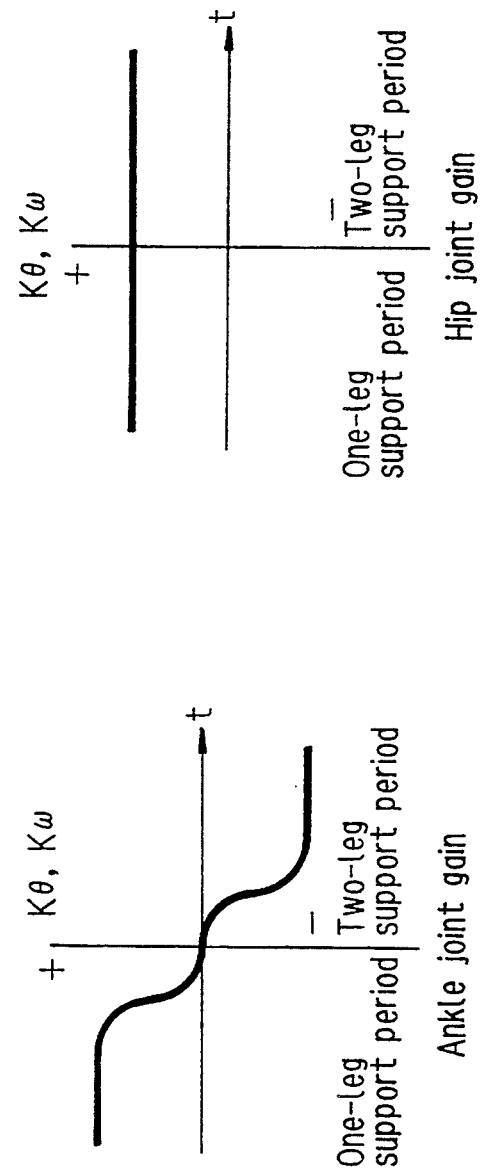
FIG. 25 is graphs showing the polarity characteristics of gains used in the fifth embodiment.

FIG. 24 is based on the robot of FIG. 1. Specifically, only the hip joints 10, 12, 14R (L), which are the subjects of the control by feedback of the angle and angular velocity of inclination of the main unit 24 with respect to the direction of gravity, are extracted and modeled. The figure also includes a block diagram of the control for this model. What characterizes this control according to this embodiment is that at the time of the feedback of the inclination angle and angular velocity to the motion of the hip joints, the polarity of the feedback is made the same during both one-leg support periods and two-leg support periods, as illustrated in FIG. 25. As a result, that there is no polarity switchover or period during which the stabilization performance is degraded by switchover, as there would otherwise be. It is therefore possible to conduct stabilization control at high gain at all times during walking and to drive the left and right hip joints such that the relative angle between the left and right legs does not substantially deviate from relative angle between the left and right legs defined by the walking pattern and such that the left and right legs do not contact each other. Owing to this arrangement, interference between the left and right legs can be prevented in advance, thus preventing unintended variations in the stride and leg separation. Here, by "relative angle between the left and right legs" is meant the relative angle between the left and right thigh links 28R, 28L.

Figure 26:
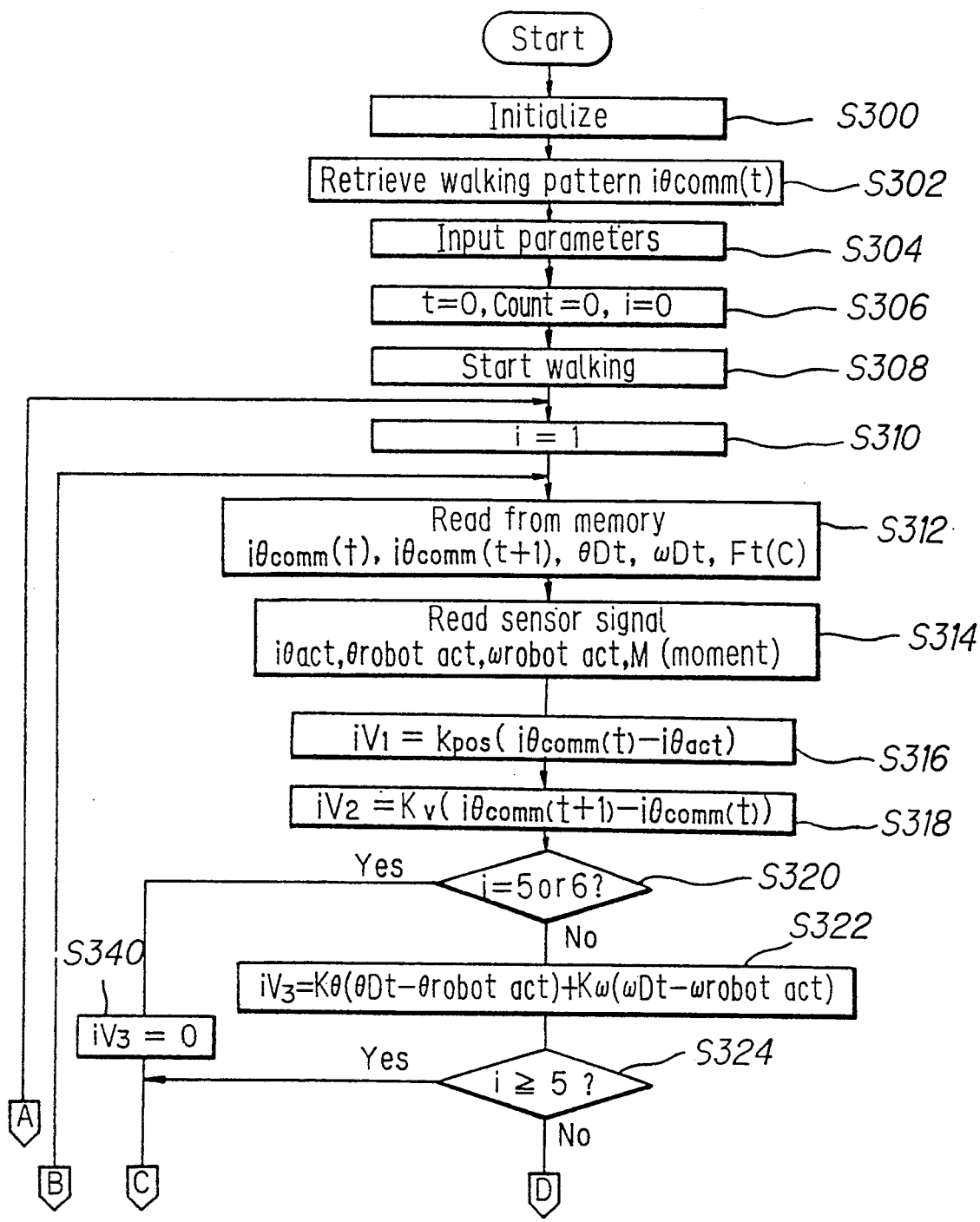
FIG. 26 is a flow chart of the first half showing the operation of the control according to the fifth embodiment.
Figure 27:
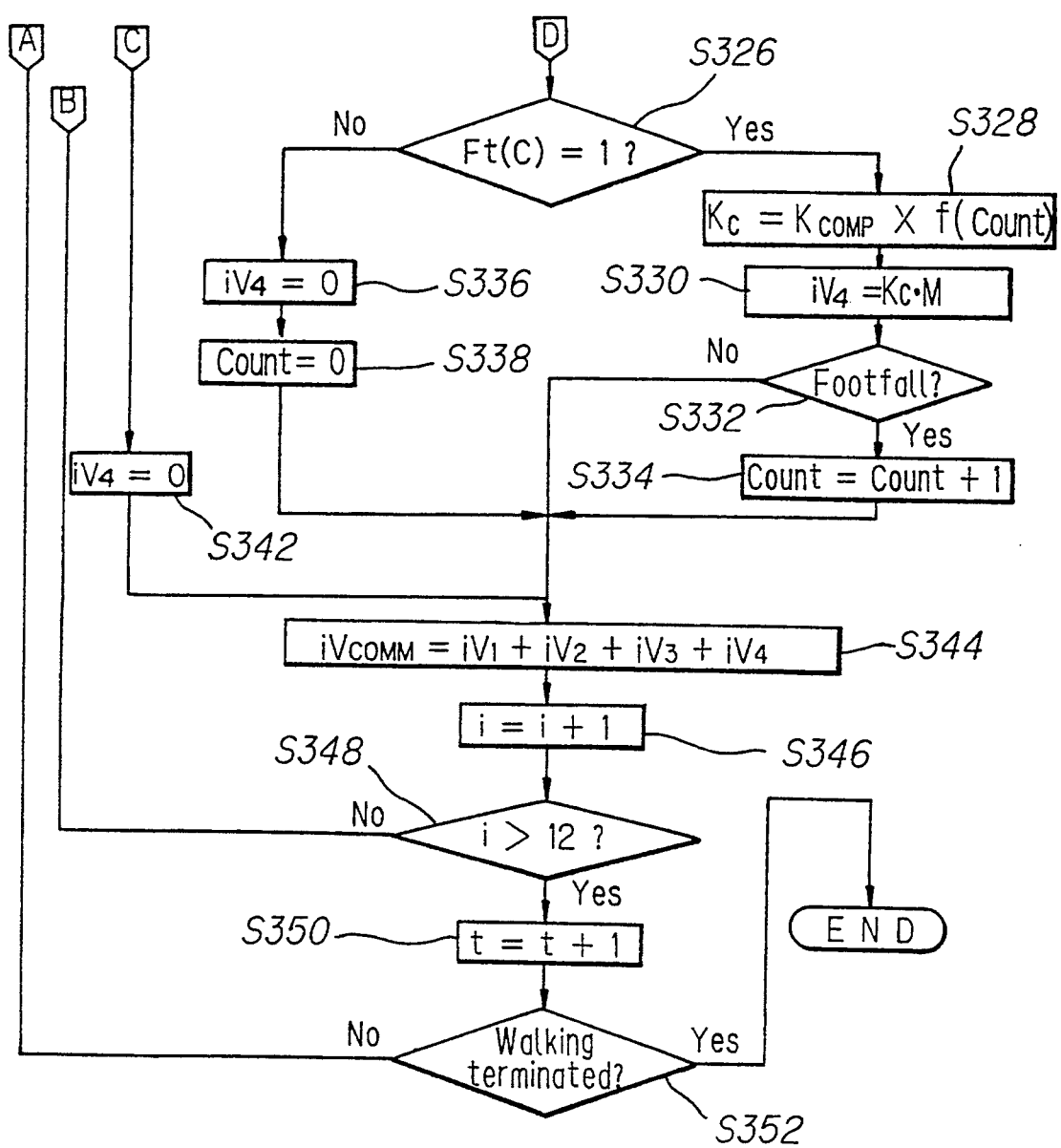
FIG. 27 is a flow chart of the second half of the flow chart of FIG. 26.

Based on the foregoing, a detailed explanation will now be made with reference to the flow charts of FIGS. 26 and 27. FIG. 26 is a flow chart of the first half of the operations of the control unit 26 shown in FIG. 2. FIG. 27 is a flow chart of the second half of the same operations.

After the different parts of the system have been initialized in step S300 of FIG. 26, control passes to step S302 in which the walking pattern $i\theta comm(t)$ is retrieved. This pattern indicates the target values of the joint angles when the robot 1 walks on an ideally flat terrain of uniform hardness. The subscript i indicates the joint number and the subscript indicates the angle at the time t. The joint numbers are assigned in order from the bottom up (20R=1, 20L=2, . . . ). (In FIG. 24, i=1 to 4 are indicated as "ankle" and i=7-12 are indicated as "hip.") As was explained earlier, these time series data are computed using a large computer after the robot 1 has been approximated by a rigid model and the computed data are stored in the ROM 66 of the microcomputer in the control unit 26.

Control then passes to step S304 in which the parameters, for example, the feedback gains Kpos, Kv . . . , are input. Then, in step S306, the time value t, the counter value Count and the joint number counter value are set to zero. Control then passes to step S308 in which walking is started and to step S310 in which the value of the counter which counts the joint numbers i is set to 1. In step S312 the joint angle $i\theta comm(t)$ (i=1) and the like corresponding to the currently set joint number are read from the ROM 66. The value $i\theta comm(t+1)$ appearing in the figure indicates the target joint angle at the next time following the current time t, namely at the time the next cycle of the program is activated. Further, $\theta Dt$ indicates the target inclination angle and omega Dt the target inclination angular velocity. In addition, Ft(C) is a flag indicating the footfall impact absorption control period. The flag bit is 1 during this period.

Control then passes to step S314 in which the sensor detection values are read. Here, $i\theta act$ indicates the actual joint angle of the ith joint, $\theta$ robot act the robot inclination angle, omega robot act the robot inclination angular velocity, and M the actual moment acting on the legs. In the following step S316 the difference between the joint angle command value $i\theta comm$ and the actual joint angle $i\theta act$ is multiplied by the position feedback control gain Kpos to calculate the position feedback control component iV1, one of the velocity command values sent to the amplifier. Next, in step S318, the difference between the joint angle command value $i\theta comm(t+1)$ at time t+1 and the joint angle command value $i\theta comm(t)$ at the current time t is multiplied by the gain Kv to calculate the velocity feedback control component iV2, another of the velocity command values sent to the amplifier.

Figure 28:
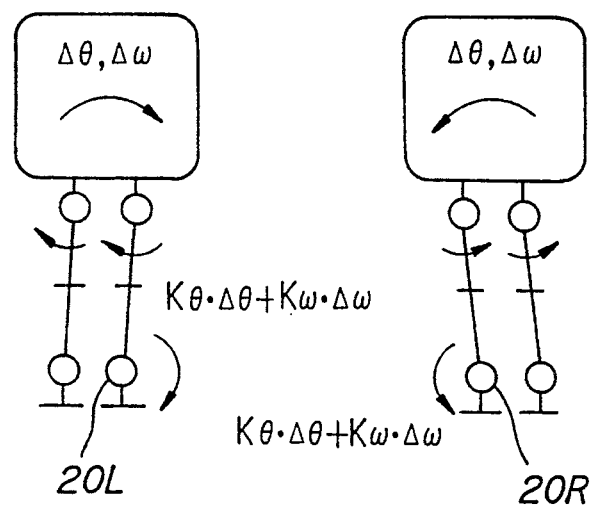
FIGS. 28 to 31 are explanatory views illustrating the direction in which joints are driven in response to detected inclination angle and angular velocity.
Figure 29:
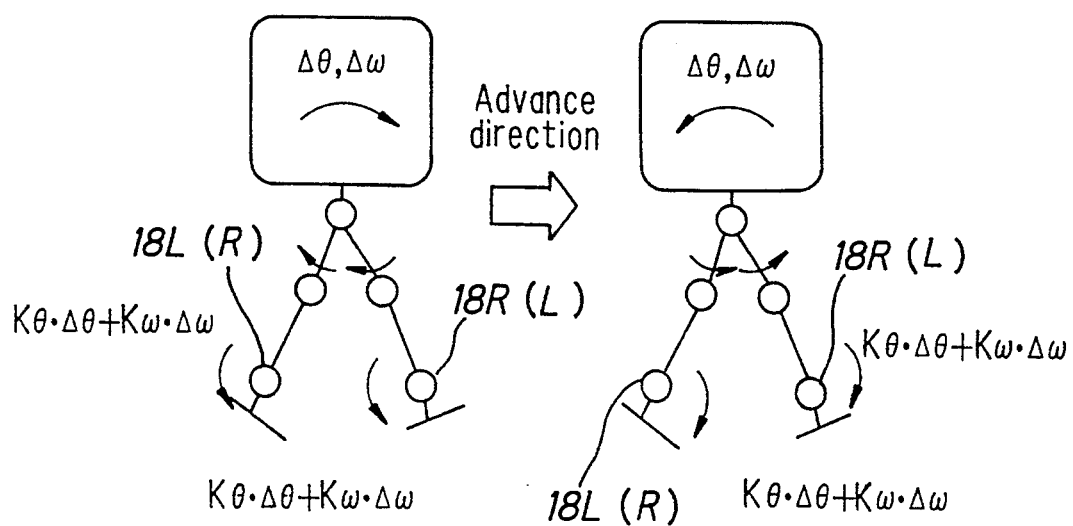
Figure 30:
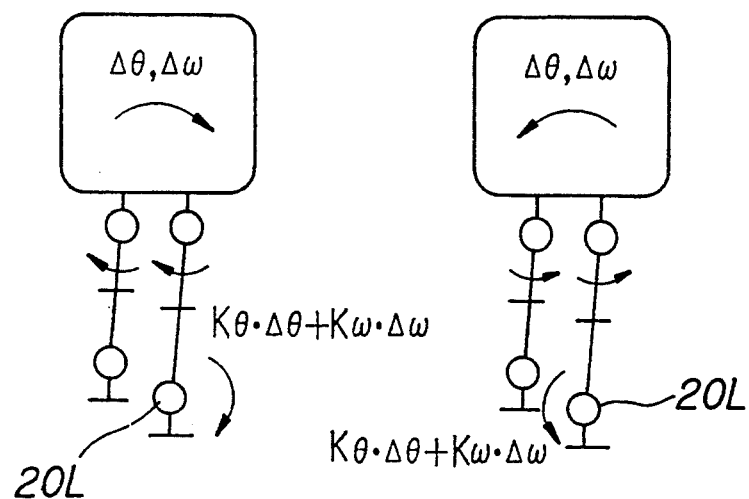
Figure 31:
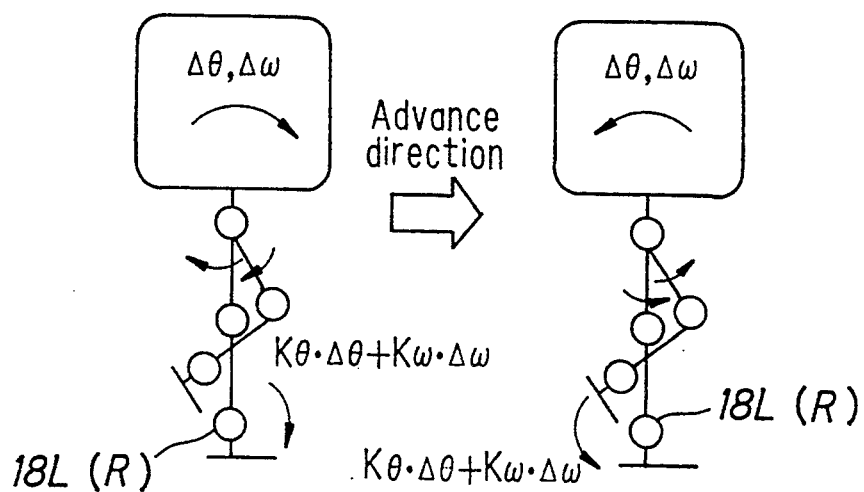

Control then passes to step S320 in which a check is made to determine whether or not the joint number i is 5 or 6, i.e. whether or not it is the number of a knee joint. If the result is negative, since it is therefore the number of one of the ankle joints 18, 20R (L) or hip joints 10, 12, 14R (L), control passes to step S322 in which the inclination control component iV3, another of the velocity command values sent to the amplifier, is calculated in the manner shown. Specifically, the third control component iV3 is calculated as the sum of the product obtained by multiplying the difference between the target value and detected value of the robot inclination angle by the control gain K$\theta$ankle (or hip) and the value obtained by multiplying the difference between the target and detected values of the robot inclination angular velocity by the control gain K omega ankle (or hip). In other words, it is judged that there is a risk of the robot tipping over if the detected inclination angle or inclination angular velocity has deviated from the target value and, in such a case, the ankle and hip joints on the side in contact with the ground are driven to produce a ground contact reaction force for restoring the proper attitude of the robot. FIGS. 28-31 lay down the rules regarding the detected inclination angle and inclination angular velocity and also regarding the direction in which the joints are driven in response to these. FIG. 28 shows the correction made in the left/right direction (y direction) in the two-leg support period, FIG. 29 the correction made in the fore/aft direction (x direction) in the two-leg support period, FIG. 30 the correction made in the left/right direction in the one-leg support period, and FIG. 31 the correction made in the fore/aft direction in the one-leg support period. The correction of the ankle joints does not differ substantially from that proposed earlier by the assignee. The present invention is characterized in that the joint drive control values of the hip joints 10, 12, 14R (L) are corrected on the basis of the inclination angle or the inclination angular velocity. Furthermore, as was explained earlier and shown in FIG. 25, the ankle joint gains $K\theta$ankle, K omega ankle are, as in the earlier application, reversed between the one-leg support period and the two-leg support period, while the hip joint gains $K\theta$hip, K omega hip are kept the same in the one-leg support period and the two-leg support period.

Figure 33:
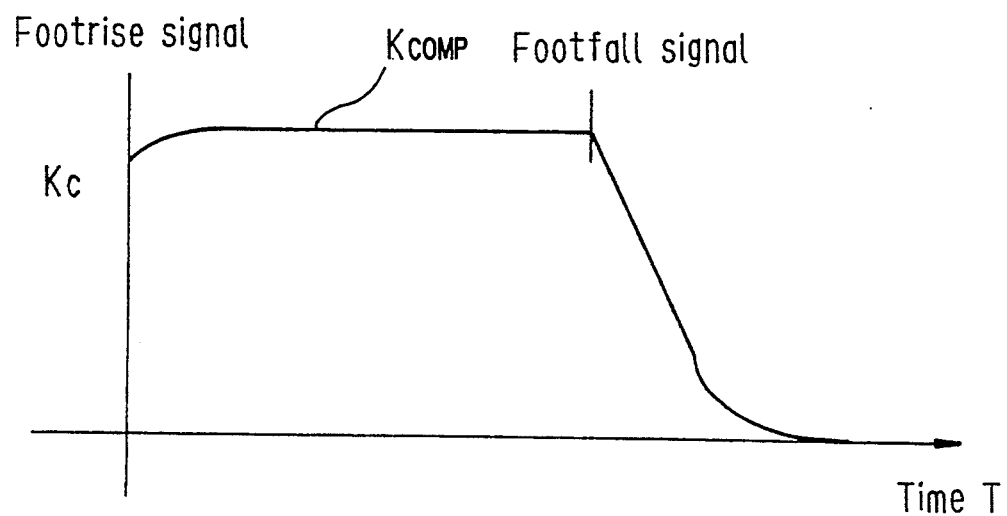
FIG. 33 is a graph illustrating a gain used in the virtual compliance control set with respect to time.

Control next passes to step S324 in the flow chart of FIG. 28, in which a check is made as to whether the joint number i is 5 or larger, i.e. whether or not the joint concerned is a joint at or above the knee. If the result is negative, since this means that the number designates the ankle joint 18 or 20R (L), control passes to step S326 of FIG. 27 in which the flag Ft(C) is checked to determine whether footfall impact absorption control is in progress. This footfall impact absorption control will be better understood from the dynamic model of the foot 22R (L) shown in FIG. 32. The entire foot is considered to be suspended by a coil spring with a spring rate Kcomp to pivot about the ankle joint, and rotational displacement is imparted in proportion to the magnitude of the moment detected to be acting on the ankle by the six-dimensional force and torque sensor 36. When the bit of the flag is found to be 1 in step S326, since this means that footfall impact absorption control is to be conducted, control passes to step S328 in which the compliance control gain Kc is calculated in the manner shown. Gain Kc is the product of a prescribed value Kcomp and f(Count) which varies between 1 and 0 with Count. Control then passes to step S330 in which the so-obtained gain Kc is used to calculate the compliance control component iV4, another of the velocity command values sent to the amplifier. Next, in step S332, it is discriminated whether or not footfall has occurred, and if it has, to step S334 in which Count is incremented, and if it has not, step S334 is skipped. Thus, gain Kc varies as shown in FIG. 33. If the bit of the flag is found not to be 1 in step S326, control passes to step S336 in which iV4 is set to zero and to step S338 in which Count is set to zero. If the result in step S320 is affirmative, control passes to step S340 in which iV3 is set to zero, and if the result in step S324 is affirmative control passes to step S342 in which iV4 is set to zero.

Control then passes to step S344 in which all of the control values calculated are added together and the total iVCOMM is output to the amplifier, step S346 in which the joint number counter is incremented, step S348 in which a discrimination is made as to whether this is the last joint, and if it is, to step S350 in which the time value t is incremented for retrieving the next target joint angle $i\theta$comm(t+1), and to step S352 in which the foregoing operations are repeated until it is found that the walking has been terminated.

In the embodiment described in the foregoing, inclination angle and angular velocity feedback control is also conducted with respect to the hip joints and the polarity of the hip joint inclination control gain is made the same in the one-leg support period and the two-leg support period. If instead the polarity should be reversed between the one-leg support period and the two-leg support period, as it is for the ankle joint inclination control gain, it would become necessary to once make the gain zero in the border region between the one-leg support period and the two-leg support period so as to ensure a smooth transition, which would degrade the stabilization in the vicinity of the border region. Moreover, as was explained earlier, correction of the hip joints increases stabilization capability by increasing resistance against large disturbances but, on the other hand, it increases the likelihood of interference between the left and right legs through contact and degrades footfall accuracy with respect to the intended footfall position, making it hard to implement during stair climbing and descent and in other such environments where the footfall position is constrained. While these disadvantages can be overcome by limiting the driving range, lowering the stabilization gain and otherwise placing limits on the system performance, this would defeat the purpose of conducting inclination control with respect to the hip joints. In the gain according to the embodiment, however, since the same gain is used in both the one-leg support period and the two-leg support period, interference between the left and right legs can be prevented in advance and unintended changes in stride and leg separation can be prevented by ensuring accurate footfall at the intended positions. In other words, the ability to stabilize attitude can be greatly improved at all times and, in particular, can be improved as much during one-leg support periods as during two-leg support periods.

Although the fifth embodiment has been explained with respect to a case in which footfall impact absorption control is conducted in addition to the inclination angle and angular velocity feedback control, the embodiment is not limited to this arrangement and it is also possible to conduct only the inclination angle and angular velocity feedback control. Nor is it necessary to conduct the inclination control with respect to both the hip joints and the ankle joints as described in the foregoing and it is instead possible to conduct it only with respect to the hip joints.

While it was explained that the inclination control is conducted by detecting and using both the inclination angle and the inclination angular velocity for the correction, the embodiment also encompasses the case where only one of these is used.

Although an example applicable to the case where the walking pattern is defined in advance, the embodiment can also be applied in cases where the walking pattern is worked out in real time during locomotion While the invention was described with respect to a biped walking robot as an example of a legged robot, the invention can also be applied to legged robots other than the biped one.

Moreover, the present invention has thus been shown and described with reference to the specific embodiments. However, it should be noted that the present invention is in no way limited to the details of the described arrangements, changes and modifications may be made without departing from the scope of the appended claims.

What is claimed is:

1. A system for controlling locomotion of a biped walking robot having a body and two articulated legs each connected to the body through a hip joint and each having at least an ankle joint, comprising:

servo motor means provided at individual joints first means for establishing a target attitude of the robot in terms of angles with respect to the direction of gravity assuming that the robot walks on a flat terrain;

second means for determining at least a target angle of each joint from the established attitude;

third means for detecting at least an actual angle of each joint;

fourth means for determining a basic control amount for each joint in response to a deviation at least between the target angle and the detected actual angle of each joint;

fifth means for estimating an attitude shift from the established attitude as angles with respect to the direction of gravity;

sixth means for determining a control correction amount indicative of a manipulated variable such that the attitude shift decreases; and control means for summing the basic control amount and the control correction amount to provide the sum to the servo motor means.

2. A system according to claim 1, wherein said sixth means determines the control correction amount on the basis of at least one of an inclination angle and angular velocity of the body with respect to the direction of gravity.

3. A system according to claim 1, wherein said sixth means determines the control correction amount on the basis of at least one of an inclination angle and angular velocity of the body with respect to the direction of gravity and the deviation at least between the target angle and the detected angle of each joint.

4. A system according to claim 1, wherein said sixth means determines the control correction amount by a state equation using the attitude shift as a state variable.

5. A system according to claim 4, wherein said sixth means changes a state feedback gain of the state equation in response to the attitude.

6. A system according to claim 4, wherein said sixth means changes a state feedback gain of the state equation in response to the frequency characteristics of a feedback signal of the state equation.

7. A system according to claim 6, wherein said sixth means changes a state feedback gain of the state equation in such a manner that the gain at a frequency range above a predetermined frequency in less than that below the predetermined frequency.

8. A system according to claim 7, wherein said sixth means changes the predetermined frequency in response to the robot's payload.

9. A system according to claim 1, wherein the joints are assigned priority in the order of the ankle joint of a supporting leg which supports the robot weight, the hip joint of the supporting leg, the ankle joint of a free leg which is lifted from the ground, and said control means sums the basic control amount and the control correction amount at least partially following the order.

10. A system according to claim 1, further including: seventh means provided in the proximity of the ankle joint to detect an external force acting on a leg lifted off of the ground.

11. A system according to claim 10, wherein said sixth means determines the control correction amount in response to the detected external force.

12. A system for controlling locomotion of a biped walking robot having a body and two articulated legs each connected to the body through a hip joint and each having an ankle joint and a knee joint, comprising:

servo motor means provided at the individual joints;

first means for establishing a target attitude of the robot in terms of angles with respect to the direction of gravity assuming that the robot walks on a flat terrain;

second means for determining at least a target angle of each joint from the established attitude;

third means for detecting at least an actual angle of each joint;

fourth means for determining a basic control amount for each joint in response to a deviation at least between the target angle and the detected actual angle of each joint;

fifth means for estimating an attitude shift from the establish attitude as angles with respect to the direction of gravity;

sixth means for determining a control correction amount indicative of a manipulated variable such that the attitude shift decreases; and control means for summing the basic control amount and the control correction amount to provide the sum to the servo motor means.

13. A system according to claim 12, wherein said sixth means determines the control correction amount on the basis of at least one of an inclination angle and angular velocity of the body with respect to the direction of gravity.

14. A system according to claim 12, wherein said sixth means determines the control correction amount on the basis of at least one of an inclination angle and angular velocity of the body with respect to the direction of gravity and the deviation at least between the target angle and the detected actual angle of each joint.

15. A system according to claim 12, wherein the joints are assigned priority in the order of the ankle joint of a supporting leg which supports the robot weight, the knee joint of the supporting leg, the hip joint of the supporting leg, the knee joint and the ankle joint of a free leg which is lifted from ground, and said control means sums the basic control amount and the control correction amount at least partially following the order.

16. A system according to claim 12, wherein said sixth means determines the control correction amount by a state equation using the attitude shift as a state variable.

17. A system according to claim 16, wherein said sixth means changes a state feedback gain of the state equation in response to the attitude.

18. A system according to claim 16, wherein said sixth means changes a state feedback gain of the state equation in response to the frequency characteristics of a feedback signal of the state equation.

19. A system according to claim 18, wherein said sixth means changes a state feedback gain of the state equation in such a manner that the gain at a frequency range above a predetermined frequency is less than that below the predetermined frequency.

20. A system according to claim 19, wherein said sixth means changes the predetermined frequency in response to the robot's payload.

21. A system according to claim 12, further including:

seventh means provided in the proximity of the ankle joint for detecting external force acting on a leg lifted from the ground.

22. A system according to claim 21, wherein:

said sixth means determines the control correction amount in response to the detected external force.

23. A system for controlling locomotion of a legged walking robot having a body and a plurality of legs each connected to the body through a first joint and each having a second joint adjacent to its distal end and a third joint provided between the first and the second joints, including:
- drive means provided at the individual joints;
- first means for deeming the individual legs as links to approximate the robot's motion by a mathematical model;
- second means for determining an absolute angle of the individual links with respect to the direction of gravity;
- third means for expressing the robot' motion as an equation of motion based on the mathematical model using parameters including the determined absolute angle and for obtaining its solution; and
- fourth means for determining a control value to be provided to the drive means in response to the solution;

wherein the improvement comprises:
- said second means determines the absolute angle from a second angle formed by a ray connecting the first and second joints with respect to the direction of gravity.

24. A system according to claim 23, wherein said second means determines the absolute angle from the second angle when the second angle is less than a predetermined angle.

25. A system for controlling locomotion of a legged walking robot having a body and a plurality of legs each connected to the body, comprising:
- drive means provided at individual joints of the robot;
- control means for determining a control value of the individual drive means;
- first means for detecting an absolute angle and/or angular velocity of a robot's portion landed on the ground with respect to the direction of gravity;
- second means for establishing a target position of a predetermined region of the robot; and
- third means for estimating a current position of the robot's predetermined region;

wherein:
- said control means correcting the control value for at least one of the individual drive means such that the estimated current position of the robot's predetermined region coincides with the target position thereof.

26. A system according to claim 25, wherein the robot's predetermined region is the robot's center of gravity.

27. A system according to claim 25, further including:
- fourth means for detecting an absolute angle and/or angular velocity of the body with respect to the direction of gravity;
- and said control means corrects the control value of the drive means for the joint which is nearest to the robot's portion landed on the ground.

28. A system for controlling locomotion of a biped walking robot having a body and two legs each connected to the body through a hip joint and each having at least an ankle joint and a foot portion below the ankle joint, comprising:
- first means for preestablishing a walking data at least including a trajectory of the robot's center of gravity;
- second means for determining target angles of the individual joints inverse kinematically from the preestablished walking data;
- servo motor means provided at the individual joints;
- control means for determining a control value of the individual servo motor means such that the joint angles follow the target angles;
- third means for detecting an absolute angle and/or angular velocity of the foot portion with respect to the direction of gravity; and
- fourth means for estimating a current position of the robot's center of gravity;

wherein:
- said control means correcting at least one of the control values for the individual servo motor means such that the estimated current position of the center of gravity follows the preestablished trajectory of the center of gravity.

29. A system according to claim 28, wherein said control means corrects the control value of the servo motor means provided at the ankle joint.

30. A system according to claim 28, further including:
- fifth means for detecting an absolute angle and/or angular velocity of the body with respect the direction of gravity;
- and said control means corrects at least one of the control values of the servo motor means in response to the detected absolute angle and/or angular velocity.

31. A system for controlling locomotion of a biped walking robot having a body and two articulated legs each connected to the body through a hip drive joint and each having at an ankle joint, comprising:
- servo motor means provided at the joints;
- first means for establishing a target angle of each joint;
- second means for detecting an actual angle of each joint;
- third means for obtaining a deviation between the established target angle and the detected actual angle to determine a first velocity command value of the serve motor means;
- fourth means for determining a differential of n-th order of an actual inclination angle of the body with respect to the direction of gravity;
- fifth means for calculating a deviation between the determined value and a reference value to determine a second velocity command value at least for the hip joint by multiplying the deviation by a gain made constant during a phase within which the robot weight is supported by both legs and a phase during which the robot weight is support by one of the two legs; and
- control (servo motor) means for summing the first and second velocity command values to provide the servo motor means of the hip and ankle joints.

32. A system according to claim 31, wherein said fifth means determines the second velocity command value for the ankle joint by multiplying the deviation by a second gain whose polarity is switched continuously between a phase within which the robot weight is supported by both legs and a phase within which the robot weight is supported by one of the two legs.

33. A system according to claim 32, wherein said fourth means determines an actual inclination angle and an actual inclination angular velocity of the body with respect to the direction of gravity and said fifth means determines the second velocity command value by calculating deviations between the determined values and reference values and by multiplying the deviations by the gain.

34. A system according to claim 31, wherein said fifth means determines the second velocity command value such that the robot restores a preestablished attitude.

35. A system according to claim 31, wherein said fourth means determines an actual inclination angle and an actual inclination angular velocity of the body with respect to the direction of gravity and said fifth means determines the second velocity command value by calculating deviations between the deviations by the gain.

* * * * *